(12) United States Patent
Chang et al.

(10) Patent No.: US 12,726,742 B2
(45) Date of Patent: Sep. 1, 2026

(54) COMMUNICATION SYSTEM, TRANSMITTER, AND COMMUNICATION METHOD

(71) Applicant: Huawei Technologies Co., Ltd., Shenzhen (CN)

(72) Inventors: Zeshan Chang, Shenzhen (CN); Tianhai Chang, Dongguan (CN); Ning Deng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 18/544,932

(22) Filed: Dec. 19, 2023

(65) Prior Publication Data

US 2024/0137675 A1 Apr. 25, 2024
US 2024/0236531 A9 Jul. 11, 2024

Related U.S. Application Data

(63) Continuation of application No. PCT/CN2022/079391, filed on Mar. 4, 2022.

(30) Foreign Application Priority Data

Jun. 21, 2021 (CN) ........................ 202110685723.X

(51) Int. Cl.
*H04Q 11/00* (2006.01)

(52) U.S. Cl.
CPC ..... *H04Q 11/0062* (2013.01); *H04Q 11/0005* (2013.01); *H04Q 2011/0032* (2013.01); *H04Q 2011/0073* (2013.01)

(58) Field of Classification Search
CPC .................................................. H04Q 11/0062
See application file for complete search history.

(56) References Cited

U.S. PATENT DOCUMENTS

2006/0171712 A1 8/2006 Tanaka et al.
2012/0008945 A1* 1/2012 Singla ................ H04J 14/0267 398/45

(Continued)

FOREIGN PATENT DOCUMENTS

CN 113872697 A 12/2021
EP 1079571 A2 2/2001

(Continued)

OTHER PUBLICATIONS

Roberto Proietti et al, "Experimental Demonstration of 8×8 10 Gb/s Low-Latency and Contention-less Wavelength Routing Optical Switch for Data Center Networks", ECOC 2010, Sep. 19-23, 2010, Torino, Italy, XP031789781, total 3 pages.

*Primary Examiner* — Shi K Li
(74) *Attorney, Agent, or Firm* — Slater Matsil, LLP

(57) ABSTRACT

A communication system, a transmitter, and a communication method. The communication system includes M transmitters, N receivers, and an optical switch network. Both N and M are positive integers greater than 1. The optical switch network includes one or more optical switches. A plurality of optical paths are configured in the optical switch network. When the transmitter communicates with the receiver, the transmitter can determine, from the plurality of optical paths, a target optical path from a source communication node to a destination communication node. After the optical switch network receives a target optical signal sent by the transmitter, the optical switch directly sends the target optical signal to the receiver based on the target optical path.

18 Claims, 9 Drawing Sheets

(56) References Cited

U.S. PATENT DOCUMENTS

| | | | | |
|---|---|---|---|---|
| 2014/0098673 | A1 * | 4/2014 | Lee | H04L 41/122<br>370/255 |
| 2024/0187099 | A1 * | 6/2024 | Kaneko | H04B 10/27 |

FOREIGN PATENT DOCUMENTS

| | | | |
|---|---|---|---|
| JP | H06121357 | A | 4/1994 |
| JP | H0775145 | A | 3/1995 |
| WO | 03001707 | A1 | 1/2003 |
| WO | 2014175835 | A1 | 10/2014 |

* cited by examiner

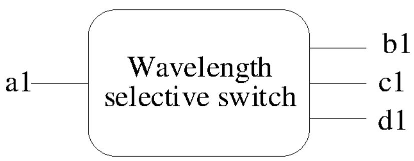
FIG. 6
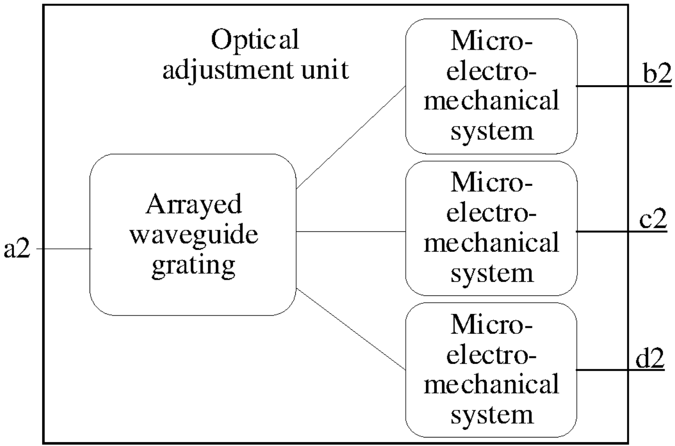
FIG. 7
10
101 Transmitter
101 Transmitter
I2
103
103b
O2
102 Receiver
FIG. 8

COMMUNICATION SYSTEM, TRANSMITTER, AND COMMUNICATION METHOD

CROSS-REFERENCE TO RELATED APPLICATIONS

This application is a continuation of International Application No. PCT/CN2022/079391, filed on Mar. 4, 2022, which claims priority to Chinese Patent Application No. 202110685723.X, filed on Jun. 21, 2021. The disclosures of the aforementioned applications are hereby incorporated by reference in their entireties.

TECHNICAL FIELD

This application relates to the communication field, and in particular, to a communication system, a transmitter, and a communication method.

BACKGROUND

A current communication system includes a plurality of communication nodes and multi-stage switches. When any two communication nodes communicate with each other, data sent by a source communication node is transmitted to a destination communication node by using at least one switch.

If the communication node is connected to the switch through an optical fiber, each time an optical signal that carries data and that is sent by the source communication node passes through a switch, the switch may first perform optical-to-electrical conversion on the received optical signal to convert the optical signal into an electrical signal, and then perform electrical-to-optical conversion to convert the electrical signal into an optical signal for sending. In this way, a high communication latency between the communication nodes is caused.

SUMMARY

Embodiments of this application provide a communication system, a transmitter, and a communication method, to reduce a communication latency in the communication system. Technical solutions are as follows.

According to a first aspect, this application provides a communication system. For example, the communication system is a data center network. The communication system includes M transmitters, N receivers, and an optical switch network. Both N and M are positive integers greater than 1. The optical switch network includes one or more optical switches. A plurality of optical paths are configured in the optical switch network.

It is assumed that a first transmitter is any one of the M transmitters, a first receiver is a receiver that is in the N receivers and that communicates with the first transmitter, the first transmitter is connected to a first source communication node, and the first receiver is connected to a first destination communication node. In this case, the first transmitter is configured to determine a target optical path from the first source communication node to the first destination communication node, and send a target optical signal to the optical switch network based on the target optical path. The target optical signal is obtained by converting a first electrical signal sent by the first source communication node. The first electrical signal may carry data information. The optical switch network is used to send the target optical signal to the first receiver based on the target optical path. The first receiver is configured to receive the target optical signal, convert the target optical signal into a second electrical signal, and then send the second electrical signal to the first destination communication node.

In the communication system provided in this embodiment of this application, the plurality of optical paths are configured in the optical switch network. After converting the first electrical signal sent by a first source communication node into the target optical signal, the first transmitter can determine, from the plurality of optical paths, a target optical path from the first source communication node to the first destination communication node. In this way, after the optical switch network receives the target optical signal sent by the first transmitter, the optical switch may directly send the target optical signal to the first receiver based on the target optical path, to enable the first receiver to convert the target optical signal into the second electrical signal and send the second electrical signal to a first destination communication node. In this way, when a first source communication node communicates with the first destination communication node, optical-to-electrical conversion does not need to be performed in the optical switch network, so that a communication latency between communication nodes is effectively reduced. In addition, the target optical path from the first source communication node to the first destination communication node is determined by the first transmitter, and the optical switch network does not need to select a communication path, so that a transmission latency of an optical signal in the optical switch network is further reduced.

For example, the first transmitter is configured to determine the target optical path from the first source communication node to the first destination communication node based on a routing table. The routing table is used to record an optical path from a source communication node to a destination communication node. There are a plurality of manners in which the routing table is used to record the optical path from the source communication node to the destination communication node. Two optional implementations are used as examples for description below.

In a first optional implementation, the routing table is used to record a correspondence between a destination communication node and a wavelength. Different optical paths that are in one-to-one correspondence with optical signals of different wavelengths transmitted by the first transmitter are configured in the optical switch network. Each optical path corresponds to one destination communication node. In this way, a wavelength corresponds to a destination communication node, to ensure that after the first transmitter transmits the optical signals of different wavelengths, the optical signals of different wavelengths can be transmitted on different optical paths in the optical switch network, so that the optical signals of different wavelengths are transmitted to corresponding destination communication nodes by using different receivers.

In this case, the first transmitter is further configured to after the first transmitter receives the first electrical signal that is sent by the first destination communication node and that carries the data information, determine a target wavelength based on the first destination communication node and the routing table, and modulate an optical signal of the target wavelength based on the received first electrical signal, to obtain the target optical signal.

In addition, each transmitter in the communication system may be connected to an input port of the switch network through one channel of optical fiber, and each receiver may be connected to an output port of the switch network through one channel of optical fiber. When the channel of optical fiber includes one optical fiber, a quantity of optical fibers used in the communication system is small, so that manufacturing costs of the communication system are effectively reduced.

Optionally, the first transmitter is further configured to after the target wavelength is determined, obtain the optical signal of the target wavelength. The following two obtaining manners are used as examples for description below.

In a first obtaining manner, the communication system further includes a light source pool. The light source pool may include one or more light sources. The light source pool is used to provide optical signals of different wavelengths. In this way, the first transmitter can select an optical signal of the target wavelength from the optical signals provided by the light source pool. For example, a quantity of light source pools may also be M. In addition, the M light source pools are connected to the M transmitters in one-to-one correspondence. Each light source pool is used to provide optical signals of different wavelengths to the corresponding transmitter. Certainly, the M transmitters in the communication system may alternatively share one light source pool, so that manufacturing costs of the communication system can be reduced.

In a second obtaining manner, the first transmitter includes a tunable laser. The tunable laser can emit optical signals of different wavelengths. In this way, the first transmitter can emit an optical signal of the target wavelength by using the tunable laser. For example, the tunable laser may be packaged in the first transmitter. For example, the tunable laser may be packaged in an optical module of the first transmitter. The first transmitter may directly provide an optical signal of the target wavelength, and no other component needs to perform related adjustment and control, so that efficiency of transmitting an optical signal by the transmitter to the optical switch network is improved.

In this embodiment of this application, there are a plurality of implementations of a structure of the optical switch network. In this embodiment of this application, the following two implementations are used as examples for description.

In a first implementation, each optical switch in the optical switch network may include a wavelength selective switch (WSS).

In a second implementation, each optical switch in the optical switch network may include an optical adjustment unit. The optical adjustment unit includes an arrayed waveguide grating (AWG) and a plurality of optical switching units. The optical adjustment unit can implement a same function as the foregoing WSS. Herein, each optical switching unit is configured to adjust an optical path direction of each channel of optical signal output by the AWG. For example, the optical switching unit may be a micro-electromechanical system (MEMS).

When the optical path is configured in the optical switch network to configure communication relationships between communication nodes in the communication system, the WSS or the MEMS of the optical adjustment unit may be controlled, to adjust connection relationships in the optical switch network. The optical path does not need to be manually configured by an operator, so that efficiency of configuring the optical path is improved.

In a second optional implementation, the routing table is used to record a correspondence between a destination communication node and an input port of the optical switch network. Different optical paths that are in one-to-one correspondence with different input ports are configured in the optical switch network. Each optical path corresponds to one destination communication node. In this way, an input port of the optical switch network corresponds to a destination communication node, to ensure that after the first transmitter transmits optical signals to different input ports, the optical signals received by the optical switch network from different input ports can be transmitted on different optical paths, so that the optical signals are transmitted to different destination communication nodes by using different receivers.

In this case, the first transmitter is further configured to after the first transmitter receives the first electrical signal that is sent by the first destination communication node and that carries the data information, determine a target input port based on the first destination communication node and the routing table, convert the received first electrical signal into the target optical signal, and then send the target optical signal to the target input port of the optical switch network.

There are a plurality of manners in which the transmitter transmits optical signals to different input ports of the optical switch network. The following two signal transmission manners are used as examples for description below.

In a first signal transmission manner, the communication system further includes a 1*N optical switching unit. The 1*N optical switching unit has one input port and a plurality of output ports. The 1*N optical switching unit is configured to select an output port from the plurality of output ports to output an optical signal. An output port of the first transmitter may be connected to the input port of the 1*N optical switching unit. In addition, each output port of the 1*N optical switching unit is connected to one input port of the optical switch network. In this way, the first transmitter can control the 1*N optical switching unit to select an output port connected to the target input port to output the target optical signal, to enable the target optical signal to be sent to the target input port of the optical switch network. For example, the 1*N optical switching unit may be a Mach-Zehnder interferometer (MZI) matrix. The MZI matrix may include a plurality of MZI optical switching units.

In a second signal transmission manner, the communication system further includes a splitter and a plurality of energy regulators. The plurality of energy regulators are respectively connected to a plurality of input ports of the optical switch network. The splitter is configured to split an optical signal input by the first transmitter into a plurality of channels of optical signals, and send the plurality of channels of optical signals to the plurality of energy regulators respectively. The energy regulator is configured to adjust energy of the optical signal sent by the splitter. In this way, the first transmitter can control the plurality of energy regulators, to enable the target optical signal to be sent to the target input port of the optical switch network. For example, the energy regulator may include an optical amplifier (optical amplifier, OA) and/or a variable optical attenuator (variable optical attenuator, VOA). For example, the OA may be a semiconductor optical amplifier (semiconductor optical amplifier, SOA).

It can be learned from the foregoing two signal transmission manners that after the first transmitter determines the target input port, the first transmitter does not need to transmit an optical signal of a specified wavelength, but only needs to transmit the optical signal to the target input port through fast adjustment of the optical switching unit (for example, the MZI optical switching unit or the energy regulator). In this way, efficiency of controlling the optical switching unit by the first transmitter is far higher than efficiency of adjusting the optical signal of the specified wavelength transmitted by the first transmitter. Therefore, efficiency of transmitting, by the first transmitter, the target optical signal to a target input port of the optical switch network is high, and a transmission latency is low.

In this embodiment of this application, there are a plurality of implementations of a structure of the optical switch network. In this embodiment of this application, the following two implementations are used as examples for description.

In a first implementation, each optical switch in the optical switch network may include a distribution frame. The distribution frame has a plurality of input ports and a plurality of output ports. Each input port of the distribution frame is connected to each output port of the distribution frame through an optical fiber.

In a second implementation, each optical switch in the optical switch network may include a subrack and a plurality of optical switching units. The subrack has a plurality of input ports and a plurality of output ports. Each input port of the subrack is connected to each output port of the subrack by using one or more optical switching units. For example, the optical switching unit may be a MEMS, and can adjust an optical path direction of an optical signal input from the input port of the subrack.

In the two implementations, each input port of the optical switch network is connected to one output port only through the optical fiber and the MEMS. Therefore, there are a small quantity of optical components in the optical switch network, and an insertion loss caused during optical signal transmission is small, so that signal transmission quality is effectively improved.

Optionally, the communication system further includes a plurality of source communication nodes, a plurality of destination communication nodes, and a centralized controller. The centralized controller is configured to generate the routing table based on the communication relationships between the plurality of source communication nodes and the plurality of destination communication nodes. For example, the centralized controller may obtain the communication relationships between the plurality of source communication nodes and the plurality of destination communication nodes based on a pre-obtained collective communication library.

In this embodiment of this application, after generating the routing table, the centralized controller may further deliver the routing table generated by the centralized controller to each transmitter. In addition, the centralized controller may control the optical switch network to establish, based on the routing table, the optical path in the optical switch network. For example, the communication system further includes an electrical switch network. The electrical switch network may include a plurality of electrical switches. Each transmitter and each receiver in the communication system may be further connected to the electrical switch network. After generating the routing table, the centralized controller may send the routing table to each transmitter by using the electrical switch network.

In this embodiment of this application, because each transmitter and each receiver are connected to the electrical switch network, the first transmitter may send control information by using the electrical switch network. For the first source communication node and the first destination communication node, the data information is transmitted by using the optical switch network. Because optical-to-electrical conversion does not need to be performed in the optical switch network, it is ensured that a communication latency of data information transmission between a transmitting end and a receiving end is low, which is usually less than 10 nanoseconds. The control information is transmitted by using the electrical switch network. Because the electrical switch network does not need to transmit the data information, a structure of the electrical switch network may be simplified compared with a structure of a conventional electrical switch network, to ensure a low communication latency of control information transmission between the transmitting end and the receiving end.

Optionally, each transmitter and each receiver may be connected to an input port of the optical switch network through one channel of optical fiber. The channel of optical fiber may include two or more optical fibers. In addition, each optical fiber in the channel of optical fiber can transmit an optical signal of a specific bandwidth. In this way, a bandwidth for transmitting an optical signal between the transmitter and the optical switch network is large, so that efficiency of transmitting the optical signal is effectively improved.

In this embodiment of this application, each transmitter and each receiver in the communication system include a network adapter and an optical module connected to the network adapter. The transmitter may pre-process an electrical signal (for example, convert a digital signal into an analog signal) by using the network adapter, and convert the electrical signal into an optical signal by using the optical module. The receiver may convert an optical signal into an electrical signal by using the optical module, and process the electrical signal by using the network adapter (for example, convert an analog signal into a digital signal).

According to a second aspect, this application provides a transmitter. For example, the transmitter may be the foregoing first transmitter. The transmitter may include a network adapter, configured to determine a target optical path from a first source communication node to a first destination communication node, and an optical module, configured to send a target optical signal to an optical switch network based on the target optical path, to enable the optical switch network to send, based on the target optical path, the target optical signal to a first receiver connected to the first destination communication node. The target optical signal is obtained by converting a first electrical signal sent by the first source communication node.

Optionally, the network adapter is configured to determine the target optical path from the first source communication node to the first destination communication node based on a routing table. The routing table is used to record an optical path from a source communication node to a destination communication node.

In an optional example, the routing table is used to record a correspondence between a destination communication node and a wavelength. Different optical paths that are in one-to-one correspondence with optical signals of different wavelengths transmitted by the first transmitter are configured in the optical switch network. Each optical path corresponds to one destination communication node. The network adapter is configured to determine a target wavelength based on the first destination communication node and the routing table. The optical module is configured to modulate an optical signal of the target wavelength based on the first electrical signal, to obtain the target optical signal.

In another optional example, the routing table is used to record a correspondence between a destination communication node and an input port of the optical switch network. Different optical paths that are in one-to-one correspondence with different input ports are configured in the optical switch network. Each optical path corresponds to one destination communication node. The network adapter is configured to determine a target input port by the first transmitter based on the first destination communication node and the routing table. The optical module is configured to send the target optical signal to the target input port of the optical switch network.

Optionally, the foregoing first electrical signal carries data information. The optical module is connected to an electrical switch network. In this case, in this embodiment of this application, the optical module is configured to send control information by using the electrical switch network.

According to a third aspect, this application provides a communication method. The communication method is applied to the communication system in the first aspect. The communication method includes a first transmitter determines a target optical path from a first source communication node to a first destination communication node, and sends a target optical signal to an optical switch network based on the target optical path. The optical switch network sends, based on the target optical path, the target optical signal to a first receiver connected to the first destination communication node. The first receiver receives the target optical signal, converts the target optical signal into a second electrical signal, and then sends the second electrical signal to the first destination communication node. The first source communication node is connected to the first transmitter. The target optical signal is obtained by converting a first electrical signal sent by the first source communication node. The first electrical signal carries data information. The optical switch network includes one or more optical switches. A plurality of optical paths are configured in the optical switch network.

Optionally, that a first transmitter determines a target optical path from a first source communication node to a first destination communication node includes the first transmitter determines the target optical path from the first source communication node to the first destination communication node based on a routing table. The routing table is used to record an optical path from a source communication node to a destination communication node.

In a first optional implementation, the routing table is used to record a correspondence between a destination communication node and a wavelength. Different optical paths that are in one-to-one correspondence with optical signals of different wavelengths transmitted by the first transmitter are configured in the optical switch network. Each optical path corresponds to one destination communication node. The communication method further includes the first transmitter determines a target wavelength based on the first destination communication node and the routing table. The first transmitter modulates an optical signal of the target wavelength based on the first electrical signal, to obtain the target optical signal.

In a second optional implementation, the routing table is used to record a correspondence between a destination communication node and an input port of the optical switch network. Different optical paths that are in one-to-one correspondence with different input ports are configured in the optical switch network. Each optical path corresponds to one destination communication node. The communication method further includes the first transmitter determines a target input port based on the first destination communication node and the routing table. The first transmitter sends the target optical signal to the target input port of the optical switch network.

Optionally, the communication method further includes a centralized controller generates the routing table based on communication relationships between a plurality of source communication nodes and a plurality of destination communication nodes.

Optionally, the communication method further includes the centralized controller establishes the plurality of optical paths of the optical switch network based on the routing table.

Optionally, the first transmitter is connected to an electrical switch network. The communication method further includes the first transmitter sends control information by using the electrical switch network.

According to a fourth aspect, this application provides a communication method. The communication method is applied to the transmitter in the second aspect. The communication method includes determining a target optical path from a first source communication node to a first destination communication node, and sending a target optical signal to an optical switch network based on the target optical path, to enable the optical switch network to send, based on the target optical path, the target optical signal to a first receiver connected to the first destination communication node. The target optical signal is obtained by converting a first electrical signal sent by the first source communication node.

Optionally, a process in which the first transmitter determines the target optical path from the first source communication node to the first destination communication node includes The first transmitter determines the target optical path from the first source communication node to the first destination communication node based on a routing table. The routing table is used to record an optical path from a source communication node to a destination communication node.

In an optional example, the routing table is used to record a correspondence between a destination communication node and a wavelength. Different optical paths that are in one-to-one correspondence with optical signals of different wavelengths transmitted by the first transmitter are configured in the optical switch network. Each optical path corresponds to one destination communication node. The method further includes The first transmitter determines a target wavelength based on the first destination communication node and the routing table. The first transmitter modulates an optical signal of the target wavelength based on the first electrical signal, to obtain the target optical signal.

In another optional example, the routing table is used to record a correspondence between a destination communication node and an input port of the optical switch network. Different optical paths that are in one-to-one correspondence with different input ports are configured in the optical switch network. Each optical path corresponds to one destination communication node. The method further includes the first transmitter determines a target input port based on the first destination communication node and the routing table. The first transmitter sends the target optical signal to the target input port of the optical switch network.

Optionally, the foregoing first electrical signal carries data information. The first transmitter is connected to an electrical switch network. In this case, in this embodiment of this application, the first transmitter may further send control information by using the electrical switch network.

According to a fifth aspect, this application provides a transmitter. The transmitter includes at least one module. The at least one module may be configured to implement the communication method according to the foregoing fourth aspect or possible implementations of the fourth aspect.

In the communication system provided in embodiments of this application, the plurality of optical paths are configured in the optical switch network. After converting the first electrical signal sent by the first source communication node into the target optical signal, the first transmitter can determine, from the plurality of optical paths, the target optical path from the first source communication node to the first destination communication node. In this way, after the optical switch network receives the target optical signal sent by the first transmitter, the optical switch may directly send the target optical signal to the first receiver based on the target optical path, to enable the first receiver to convert the target optical signal into the second electrical signal and send the second electrical signal to the first destination communication node. In this way, when the first source communication node communicates with the first destination communication node, optical-to-electrical conversion does not need to be performed in the optical switch network, so that the communication latency between the communication nodes is effectively reduced. In addition, the target optical path from the first source communication node to the first destination communication node is determined by the first transmitter, and the optical switch network does not need to select the communication path, so that the transmission latency of the optical signal in the optical switch network is further reduced.

BRIEF DESCRIPTION OF THE DRAWINGS

FIG. 6 is a schematic diagram of a structure of a WSS according to an embodiment of this application;

FIG. 7 is a schematic diagram of a structure of an optical adjustment unit according to an embodiment of this application;

FIG. 8 is a schematic diagram of a structure of yet another communication system according to an embodiment of this application;

DETAILED DESCRIPTION OF ILLUSTRATIVE EMBODIMENTS

To make principles and technical solutions of this application clearer, the following further describes implementations of this application in detail with reference to the accompanying drawings.

In a conventional communication system, communication nodes communicate by using an electrical switch network. In each time of communication, an electrical switch in the electrical switch network needs to perform optical-to-electrical conversion at least once and electrical-to-optical conversion at least once, resulting in a high communication latency between the communication nodes. In addition, after receiving a signal sent by a source communication node, the electrical switch network may further select a communication path, to ensure that the signal is sent to a destination communication node. For example, it is assumed that the source communication node communicates with the destination communication node by using at least two electrical switches in the electrical switch network. In this case, the at least two electrical switches separately perform communication path selection once. In other words, in a communication process, the electrical switch network performs communication path selection at least twice. This further increases a communication latency between the communication nodes.

Figure 1:
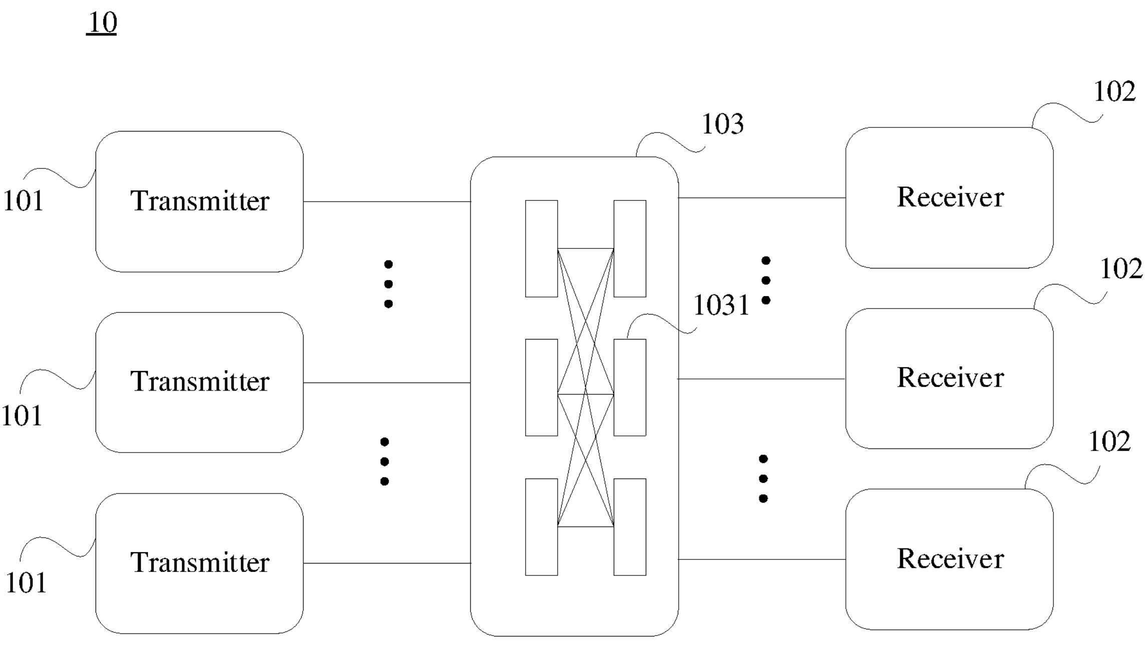
FIG. 1 is a schematic diagram of a structure of a communication system according to an embodiment of this application.

FIG. 1 is a schematic diagram of a structure of a communication system according to an embodiment of this application. As shown in FIG. 1, the communication system 10 may include M transmitters 101, N receivers 102, and an optical switch network 103. For example, both M and N are positive integers, for example, both are positive integers greater than 1. Herein, values of M and N may be the same or may be different. The optical switch network 103 may include one or more optical switches 1031. The optical switch 1031 is used for optical signal exchange (which is also referred to as direction selection). Different from an electrical switch, optical-to-electrical conversion does not need to be performed on an optical signal passing through the optical switch. In other words, the optical switch is a switch directly specific to the optical signal. In this way, the optical switch network 103 can directly transmit the optical signal on an entire network (that is, only the optical signal is transmitted in the optical switch network), and the optical switch network 103 does not need to have an optical-to-electrical conversion function or an electrical-to-optical conversion function. A plurality of optical paths are configured in the optical switch network 103. The optical path refers to a path, between a source communication node and a destination communication node, for an optical signal to pass through, and is also referred to as an optical channel.

To explain communication relationships between components in the communication system 10 more clearly, in the following embodiments, an example in which a first transmitter sends a signal to a first receiver is used for description. The first transmitter is any one of the M transmitters 101. The first receiver is a receiver that is in the N receivers 102 and that communicates with the first transmitter. A first source communication node is connected to the first transmitter. A first destination communication node is connected to the first receiver.

The first transmitter is configured to determine a target optical path from the first source communication node to the first destination communication node, and send a target optical signal to the optical switch network 103 based on the target optical path. The target optical signal is obtained by converting a first electrical signal sent by the first source communication node. For example, the first electrical signal may carry data information or control information. The optical switch network 103 is configured to send the target optical signal to the first receiver based on the target optical path. The first receiver is configured to receive the target optical signal, convert the target optical signal into a second electrical signal, and then send the second electrical signal to the first destination communication node. It should be noted that the first electrical signal and the second electrical signal may be the same or may be different. For example, the second electrical signal may have a bit error or a packet loss compared with the first electrical signal, and consequently the second electrical signal and the first electrical signal are different.

In the communication system provided in this embodiment of this application, the plurality of optical paths are configured in the optical switch network. After converting the first electrical signal sent by a first source communication node into the target optical signal, the first transmitter can determine, from the plurality of optical paths, a target optical path from the first source communication node to the first destination communication node. In this way, after the optical switch network receives the target optical signal sent by the first transmitter, the optical switch may directly send the target optical signal to the first receiver based on the target optical path, to enable the first receiver to convert the target optical signal into the second electrical signal and send the second electrical signal to a first destination communication node. In this way, when a first source communication node communicates with the first destination communication node, optical-to-electrical conversion does not need to be performed in the optical switch network, so that a communication latency between communication nodes is effectively reduced. In addition, the target optical path from the first source communication node to the first destination communication node is determined by the first transmitter, and the optical switch network does not need to select a communication path, so that a transmission latency of an optical signal in the optical switch network is further reduced. Furthermore, compared with a conventional communication system in which an electrical switch network performs communication path selection for a plurality of times to complete path selection, in the communication system provided in this embodiment of this application, the first transmitter needs to perform communication path selection only once to complete path selection. Because a path selection latency is reduced, an overall transmission latency in the communication system is effectively reduced.

Figure 2:
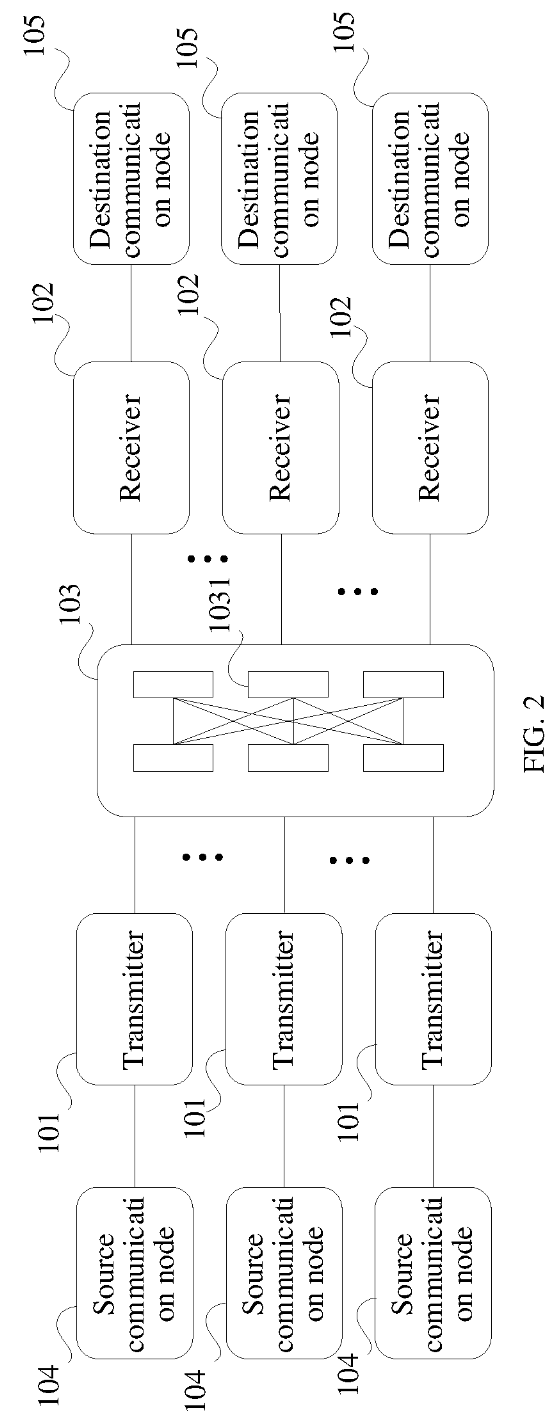
FIG. 2 is a schematic diagram of a structure of another communication system according to an embodiment of this application.

FIG. 2 is a schematic diagram of a structure of another communication system according to an embodiment of this application. As shown in FIG. 2, the communication system 10 may further include a plurality of source communication nodes 104 and a plurality of destination communication nodes 105. Each transmitter 101 may be connected to at least one source communication node 104. Each receiver 102 may be connected to at least one destination communication node 105.

Herein, each source communication node 104 and each destination communication node 105 in the communication system 10 may be processing units having a processing function (for example, a computing function) such as central processing units (CPUs), GPUs (GPUs), or chips in a server, or storage units having a storage function such as memories. The source communication node is a signal source that can provide an electrical signal. It should be noted that the at least one source communication node 104 and/or the at least one destination communication node 105 may be integrated into one server. It should be further noted that FIG. 2 is described by using an example in which each transmitter 101 is connected to one source communication node 104 and each receiver 102 is connected to one destination communication node 105, but does not limit a connection relationship between the transmitter 101 and the source communication node 104 and a connection relationship between the receiver 102 and the destination communication node 105.

In this embodiment of this application, each transmitter 101 and each receiver 102 in the communication system 10 include network adapters and optical modules connected to the network adapters. The transmitter 101 may pre-process an electrical signal (for example, convert a digital signal into an analog signal) by using the network adapter, and convert the electrical signal into an optical signal by using the optical module. The receiver 102 may convert an optical signal into an electrical signal by using the optical module, and process the electrical signal by using the network adapter (for example, convert an analog signal into a digital signal).

Each transmitter 101 in the communication system 10 stores a routing table. For example, the routing table may be stored in the network adapter of the transmitter 101. The routing table is used to record an optical path from the source communication node 104 to the destination communication node 105. Usually, one routing table may record at least one optical path. When a first source communication node 1041 sends, to a first destination communication node 1051, a target optical signal that carries data information, a first transmitter may determine, based on the routing table, a target optical path from the first source communication node 1041 to the first destination communication node 1051, so that after receiving the target optical signal sent by the first transmitter, an optical switch network 103 can send, based on the target optical path, the target optical signal to the first destination communication node 1051 by using a first receiver.

In this embodiment of this application, an optical path configured in the optical switch network 103 may be identified in a plurality of manners. Correspondingly, there are also a plurality of manners of recording, in the routing table, the optical path from the source communication node 104 to the destination communication node 105.

For example, different optical paths may be configured in the optical switch network 103. Different optical paths are in one-to-one correspondence with optical signals of different wavelengths of different transmitters. In this way, the optical path may be identified by using the wavelength of the optical signal transmitted by the transmitter, and optical signals of different wavelengths transmitted by a same transmitter are transmitted through different optical paths. In this case, after receiving an optical signal, the optical switch network 103 transmits the optical signal on a corresponding optical path based on a wavelength of the optical signal. In this case, the routing table may record a correspondence between a destination communication node 105 and a wavelength.

For another example, different optical paths may be configured in the optical switch network 103. Different optical paths are in one-to-one correspondence with different input ports of the optical switch network. In this way, the optical path may be identified by using the input port of the optical switch network, and optical signals received by different input ports of the optical switch network 103 are transmitted through different optical paths. In this case, after a specific input port of the optical switch network 103 receives an optical signal, the optical switch network 103 may transmit the optical signal through an optical path corresponding to the input port. In this case, the routing table may record a correspondence between a destination communication node 105 and an input port of the optical switch network 103.

With reference to the foregoing examples, in embodiments of this application, the following two optional implementations are used as examples for description. In addition, to explain communication relationships between components in the communication system 10 more clearly, in the following embodiments, an example in which the first transmitter sends a signal to the first receiver is used for description.

Figure 3:
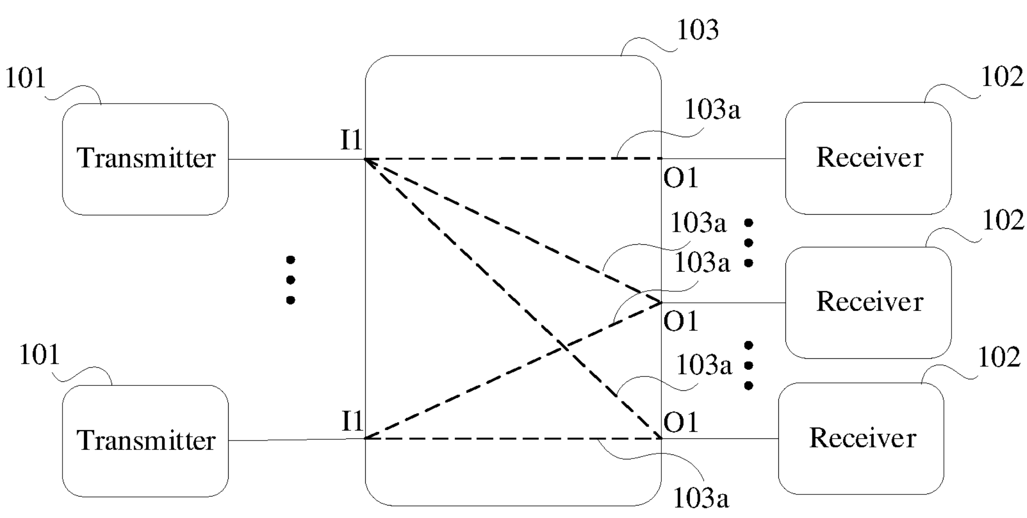
FIG. 3 is a schematic diagram of a structure of still another communication system according to an embodiment of this application.

A first optional implementation is shown in FIG. 3. FIG. 3 is a schematic diagram of a structure of still another communication system according to an embodiment of this application. When a routing table is used to record a correspondence between a destination communication node and a wavelength, different optical paths 103*a* (which are dashed parts in FIG. 3) that are in one-to-one correspondence with optical signals of different wavelengths transmitted by different transmitters 101 are configured in an optical switch network 103. Each optical path 103*a* corresponds to one destination communication node. In this way, a wavelength corresponds to a destination communication node, to ensure that after the first transmitter transmits optical signals of different wavelengths, the optical signals of different wavelengths can be transmitted on different optical paths in the optical switch network 103, so that the optical signals of different wavelengths are transmitted to corresponding destination communication nodes by using different receivers 102.

For example, each transmitter 101 in the communication system 10 may be connected to one input port I1 of the switch network 103 through one channel of optical fiber, and each receiver 102 may be connected to one output port O1 of the switch network 103 through one channel of optical fiber. In the optical switch network 103, each input port I1 may be connected to a different output port O1 through a different optical path 103*a*. In the optical switch network 103, after an input port I1 connected to the first transmitter receives a target optical signal, the optical switch network 103 can transmit, based on a wavelength of an optical signal input from the input port I1, an optical signal on an optical path corresponding to the wavelength, so that the optical signal can be output from a corresponding output port O1. Optionally, the foregoing channel of optical fiber includes one optical fiber.

In this case, it is assumed that a first source communication node sends data information to a first destination communication node. In this case, after receiving a first electrical signal that is sent by the first source communication node and that carries the data information, the first transmitter may perform the following steps to obtain a target optical signal.

A1: Determine a target wavelength based on the first destination communication node and the routing table.

In this embodiment of this application, there are a plurality of implementations of the routing table in the communication system. The following two implementations are used as examples for description below.

In a first implementation, each transmitter 101 in the communication system 10 obtains a same routing table. The routing table is used to record a correspondence between an identifier of a transmitter, an identifier of a destination communication node, and a wavelength. In this case, the first transmitter may query the routing table based on an identifier of the first transmitter and an identifier of the first destination communication node, to obtain a corresponding target wavelength.

In a first case, a plurality of transmitters in the communication system are connected to a plurality of source communication nodes in one-to-one correspondence. In this case, a transmitter may uniquely determine a source communication node connected to the transmitter. In this way, the routing table may be used to record the correspondence between an identifier of a transmitter, an identifier of a destination communication node, and a wavelength. For example, for the correspondence recorded in the routing table, refer to the following Table 1.

TABLE 1

| Identifier of the transmitter | Wavelength | Identifier of the destination communication node |
|---|---|---|
| M1 | λ1 | P1 |
| M1 | λ2 | P2 |
| M2 | λ3 | P3 |

Using the first row in Table 1 as an example, the identifier of the transmitter is M1, the identifier of the destination communication node is P1, and a corresponding wavelength is λ1. Assuming that the transmitter M1 is connected to a source communication node P0, it indicates that if the source communication node is P0 and the destination communication node is P1, the transmitter M1 transmits an optical signal of the wavelength λ1.

In a second case, at least one transmitter in the communication system is connected to a plurality of source communication nodes. In this case, the routing table may be used to record a correspondence between an identifier of a transmitter, an identifier of a source communication node, an identifier of a destination communication node, and a wavelength. For example, for the correspondence recorded in the routing table, refer to the following Table 2.

TABLE 2

| Identifier of the transmitter | Wavelength | Identifier of the source communication node | Identifier of the destination communication node |
|---|---|---|---|
| M1 | λ1 | P0 | P1 |
| M1 | λ2 | P0 | P2 |
| M2 | λ3 | P1 | P3 |

Using the second row in Table 2 as an example, the identifier of the transmitter is M1, the identifier of the source communication node is P0, the identifier of the destination communication node is P2, and a corresponding wavelength is λ2. In this case, it indicates that if the source communication node is P0 and the destination communication node is P2, the transmitter M1 transmits an optical signal of the wavelength λ2.

In a second implementation, each transmitter 101 in the communication system 10 obtains a different routing table, the routing table obtained by each transmitter 101 corresponds to the transmitter, and the routing table corresponding to each transmitter is used to record a correspondence between an identifier of a destination communication node and a wavelength transmitted by the transmitter. In this case, the first transmitter may first obtain a routing table corresponding to the first transmitter. It is assumed that the routing table is a first routing table. The first routing table is used to record a correspondence between an identifier of a destination communication node and a wavelength transmitted by the first transmitter. Then the first transmitter queries the first routing table by using an identifier of the first destination communication node, to obtain a corresponding target wavelength.

In a first case, a plurality of transmitters in the communication system are connected to a plurality of source communication nodes in one-to-one correspondence. In this case, a transmitter may uniquely determine a source communication node connected to the transmitter. Using the first routing table as an example, the first routing table may be used to record the correspondence between an identifier of a destination communication node and a wavelength. For example, for the correspondence recorded in the first routing table, refer to the following Table 3.

TABLE 3

| Wavelength | Identifier of the destination communication node |
|---|---|
| λ1 | P1 |
| λ2 | P2 |
| λ3 | P3 |

Using the first row in Table 3 as an example, the identifier of the destination communication node is P1 and a corresponding wavelength is λ1. Assuming that the first transmitter is connected to a source communication node P0, it indicates that if the source communication node is P0 and the destination communication node is P1, the first transmitter transmits an optical signal of the wavelength λ1.

In a second case, at least one transmitter in the communication system is connected to a plurality of source communication nodes. In this case, assuming that the first transmitter is connected to a plurality of source communication nodes, the first routing table may be used to record a correspondence between an identifier of a source communication node, an identifier of a destination communication node, and a wavelength. For example, for the correspondence recorded in the first routing table, refer to the following Table 4.

TABLE 4

| Wavelength | Identifier of the source communication node | Identifier of the destination communication node |
|---|---|---|
| λ1 | P0 | P1 |
| λ2 | P0 | P2 |
| λ3 | P1 | P3 |

Using the second row in Table 4 as an example, the identifier of the source communication node is P0, the identifier of the destination communication node is P2, and a corresponding wavelength is λ2. In this case, it indicates that if the source communication node is P0 and the destination communication node is P2, the first transmitter transmits an optical signal of the wavelength λ2.

In the foregoing two implementations, in different communication scenarios, in addition to corresponding to the destination communication node, the target wavelength transmitted by the first transmitter may also have a correspondence with another communication parameter. In this case, the routing table may record a correspondence between another communication parameter, a destination communication node, and a wavelength. The first transmitter queries the routing table by using the obtained another communication parameter and the identifier of the first destination communication node, to obtain a corresponding target wavelength.

For example, the another communication parameter is a slot. In this case, using the second case in the foregoing second implementation as an example, the first routing table may be further used to record a correspondence between a slot, an identifier of a source communication node, an identifier of a destination communication node, and a wavelength. For example, for the correspondence recorded in the first routing table, refer to the following Table 5.

TABLE 5

| Slot | Wavelength | Identifier of the source communication node | Identifier of the destination communication node |
|---|---|---|---|
| T1 | λ1 | P0 | P1 |
| T2 | λ2 | P0 | P2 |
| T3 | λ3 | P0 | P3 |

Using the third row in Table 5 as an example, the slot is T3, the identifier of the source communication node is P0, the identifier of the destination communication node is P3, and a corresponding wavelength is λ3. In this case, it indicates that if the source communication node is P0 and the destination communication node is P3, the first transmitter transmits an optical signal of the wavelength λ3 in the communication slot T3.

A2: Modulate an optical signal of the target wavelength based on the received first electrical signal, to obtain the target optical signal.

For example, the first transmitter may directly modulate intensity of the optical signal of the target wavelength based on the received first electrical signal, to obtain the target optical signal. Alternatively, coherent modulation is performed on the optical signal of the target wavelength based on the received first electrical signal, to obtain the target optical signal. For example, the coherent modulation is quadrature phase shift keying (Quadrature Phase Shift Keying, QPSK) modulation. The foregoing modulation scheme is not limited in this embodiment of this application.

In this way, after the first transmitter sends the target optical signal to the optical switch network through the optical fiber, the optical switch network can transmit the target optical signal through the target optical path corresponding to the target wavelength, to send the target optical signal to the first receiver through the optical fiber. Subsequently, after receiving the target optical signal, the first receiver may convert the target optical signal into a second electrical signal, and then send the second electrical signal to the first destination communication node.

In this embodiment of this application, there are a plurality of manners in which the transmitter obtains optical signals of different wavelengths. In this embodiment of this application, the following two obtaining manners are used as examples for description.

In a first obtaining manner, the communication system 10 may further include a light source pool. The light source pool may include one or more light sources. The light source pool is used to provide optical signals of different wavelengths. In this way, each transmitter 101 can select an optical signal of a required wavelength from the light source pool. For example, after determining the target wavelength based on the foregoing step A1, the first transmitter selects an optical signal of the target wavelength from the optical signals of different wavelengths provided by the light source pool 106.

In an optional example, the communication system includes M light source pools that are in one-to-one correspondence with the M transmitters 101. Each light source pool is used to provide optical signals of different wavelengths to the corresponding transmitter 101. For example, each light source pool may be connected to the corresponding transmitter 101. Alternatively, some or all of the M light source pools are integrated into the transmitter 101.

Figure 4:
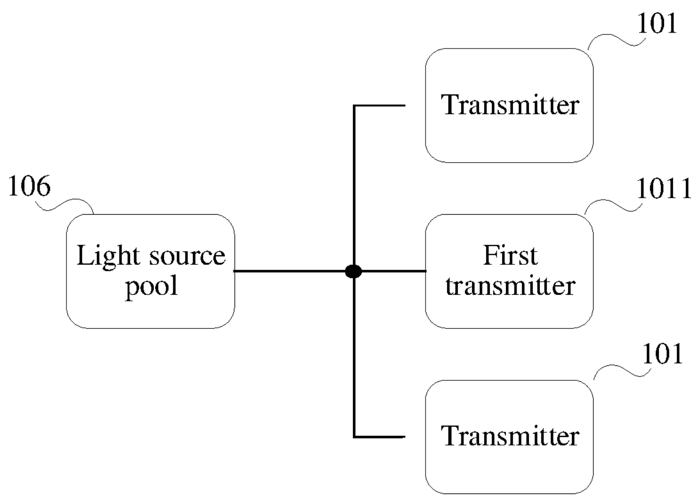
FIG. 4 is a schematic diagram of a connection relationship between a light source pool and a transmitter in a communication system according to an embodiment of this application.

Another optional example is shown in FIG. 4. FIG. 4 is a schematic diagram of a connection relationship between a light source pool and a transmitter in the communication system according to an embodiment of this application. The M transmitters 101 in the communication system 10 may share the light source pool 106. Because a single light source pool has high manufacturing costs and is easily damaged, in this application, the light source pool 106 is shared, so that centralized management and maintenance of the light source pool can be implement, to facilitate timely fault diagnosis when light sources in the light source pool are faulty, to reduce use and maintenance costs of the light sources and improve safety and reliability of the light sources. In addition, the light sources included in the light source pool 106 may be packaged in an integrated manner, for example, packaged into an optical chip or an optical module that can transmit one or more channels of optical signals. In this way, manufacturing costs can be reduced.

In the foregoing two optional examples, each light source pool may include a plurality of light sources. Each light source is used to provide an optical signal of one wavelength. Each transmitter 101 may be connected to the light source pool 106 by using an optical switching unit corresponding to the transmitter 101. Each transmitter 101 may enable, by controlling the corresponding optical switching unit, the light source pool 106 to transmit an optical signal of a required wavelength to the transmitter 101. It should be noted that, for a type and a working principle of the optical switching unit, refer to a corresponding part in the following embodiments. Details are not described herein.

Figure 5:
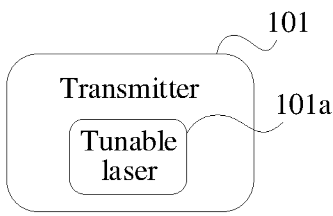
FIG. 5 is a schematic diagram of a structure of a transmitter according to an embodiment of this application.

A second obtaining manner is shown in FIG. 5. FIG. 5 is a schematic diagram of a structure of a transmitter according to an embodiment of this application. Each transmitter 101 in the communication system 10 may include a tunable laser (tunable Laser) 101*a*. In this way, each transmitter 101 can emit an optical signal of a required wavelength by using the tunable laser 101*a*. For example, after determining the target wavelength based on the foregoing step A1, the first transmitter can emit an optical signal of the target wavelength by using the tunable laser 101*a*. The tunable laser 101*a* may be a temperature-controlled laser, and a wavelength of the tunable laser 101*a* is adjusted by adjusting a temperature. The tunable laser 101*a* may alternatively be an electronically controlled laser, and a wavelength of the tunable laser 101*a* is adjusted by adjusting a voltage. The tunable laser 101*a* may alternatively be a magnetically controlled laser, and a wavelength the tunable laser 101*a* is adjusted by adjusting a magnetic force. Because the temperature-controlled laser has a simple structure and is easy to control, the temperature-controlled laser may be widely used in a transmitter.

For example, the tunable laser 101*a* may be packaged in the optical module of the transmitter 101. The transmitter 101 can directly provide, based on a wavelength of an optical signal transmitted to the optical switch network 103 based on a requirement of the transmitter 101, an optical signal of a corresponding wavelength, and no other component is needed to perform related adjustment and control, to improve efficiency of transmitting an optical signal by the transmitter 101 to the optical switch network 103.

In this embodiment of this application, there are a plurality of implementations of a structure of the optical switch network 103. In this embodiment of this application, the following two implementations are used as examples for description.

In a first implementation, each optical switch in the optical switch network 103 may include a wavelength selective switch (WSS). In this case, the optical switch network 103 may be a network formed by connecting a plurality of WSSs. For example, FIG. 6 is a schematic diagram of a structure of a WSS according to an embodiment of this application. The WSS has a first port a1 and a plurality of second ports. For example, the plurality of second ports are respectively a second port b1, a second port c1, and a second port d1. The first port a1 of the WSS is configured to be connected to one transmitter and a second port of another WSS. Each second port of the WSS is configured to be connected to one receiver or a first port of another WSS. At least a part of an optical path of the optical switch network 103 is formed between the first port a1 and each second port of the WSS. When the first port is connected to the transmitter, and the second port is connected to the receiver, the first port is an input port, and the second port is an output port. When the second port is connected to the transmitter, and the first port is connected to the receiver, the first port is an output port, and the second port is an input port. It is assumed that the first port is an input port, and the second port is an output port. After the first port a1 of the WSS receives one channel of optical signal, the WSS can output, based on a wavelength of the received optical signal, an optical signal through a second port that is configured to transmit the optical signal of the wavelength and that is in the plurality of second ports of the WSS. For example, when the wavelength of the optical signal received by the first port a1 of the WSS is λ1, the WSS transmits the optical signal through the second port b1. When the wavelength of the optical signal received by the first port a1 of the WSS is λ2, the WSS transmits the optical signal through the second port c1. When the wavelength of the optical signal received by the first port a1 of the WSS is A3, the WSS transmits the optical signal through the second port d1.

In this embodiment of this application, when the optical path is configured in the optical switch network 103 to configure communication relationships between the communication nodes in the communication system, the WSS in the optical switch network 103 may be controlled, to adjust connection relationships in the optical switch network 103. Because the WSS has an optical path switching function, the WSS supports millisecond-level fast connection relationship adjustment based on a wavelength. Therefore, complexity of configuring the optical path in the optical switch network 103 can be effectively simplified, thereby improving efficiency of configuring the optical path.

For example, it is assumed that there are two output ports in the optical switch network: an output port a and an output port b. The output port a is connected to the destination communication node P1 by using the receiver, and the output port b is connected to the destination communication node P2 by using the receiver. Before the optical path in the optical switch network is adjusted, if the optical signal of the wavelength λ1 is output through the output port of the WSS, the optical signal may be output through the output port a of the optical switch network, and the optical signal output through the output port a may be transmitted to the destination communication node P1. In this case, after the optical path in the optical switch network is adjusted, after the optical signal of the wavelength λ1 is output through the output port of the WSS, the optical signal may be output through the output port b of the optical switch network, and the optical signal output through the output port b may be transmitted to the destination communication node P2. In this case, when the optical path in the optical switch network is adjusted, a connection relationship between each transmitter and/or receiver and the optical switch network does not need to be changed, and only the optical path configured in the optical switch network needs to be changed. In this way, the communication relationships between the communication nodes in the communication system provided in this embodiment of this application may be adjusted based on different usage scenarios, so that flexibility of using the communication system is effectively improved.

In a second implementation, each optical switch in the optical switch network 103 may include an optical adjustment unit. The optical adjustment unit includes an AWG and a plurality of optical switching units. In this case, the optical switch network 103 may be a network formed by connecting a plurality of optical adjustment units. Each optical switching unit is configured to adjust an optical path direction of each channel of optical signal output by the AWG. For example, the optical switching unit may be an MEMS.

For example, FIG. 7 is a schematic diagram of a structure of an optical adjustment unit according to an embodiment of this application. The optical adjustment unit can implement a same function as the foregoing WSS. The optical adjustment unit has a first port a2 and a plurality of second ports. For example, the plurality of second ports are respectively a second port b2, a second port c2, and a second port d2. The AWG in the optical adjustment unit has a first port and a plurality of second ports. The first port of the AWG is the first port a2 of the optical adjustment unit. Each second port of the AWG is connected to one end of one MEMS, and the other end of the MEMS is a second port of the optical adjustment unit. The first port a2 of the optical adjustment unit is configured to be connected to a second port of one transmitter or another optical adjustment unit. Each second port of the optical adjustment unit is configured to be connected to one receiver or a first port of another optical adjustment unit. At least a part of an optical path of the optical switch network 103 is formed between the first port of the AWG and each MEMS of the optical adjustment unit. When the first port is connected to the transmitter, and the second port is connected to the receiver, the first port is an input port, and the second port is an output port. When the second port is connected to the transmitter, and the first port is connected to the receiver, the first port is an output port, and the second port is an input port. It should be noted that two ends of the MEMS are respectively connected to the second port of the AWG and the second port of the optical adjustment unit, and the MEMS can establish a transmission channel of an optical signal between the second port of the AWG and the second port of the optical adjustment unit. When the MEMS is on (which is also referred to as turned on), the transmission channel is enabled. When the MEMS is off, the transmission channel is disabled.

It is assumed that the first port is an input port, and the second port is an output port. After the first port a2 of the optical adjustment unit receives one channel of optical signal, the AWG in the optical adjustment unit can select, based on a wavelength of the received optical signal, one second port from the plurality of second ports of the AWG to output the optical signal, so that the optical signal can be output through corresponding second ports of the MEMS and the optical adjustment unit. For example, when the wavelength of the optical signal received by the first port a2 of the optical adjustment unit is λ1, the optical adjustment unit transmits the optical signal by using the second port b2 configured to transmit the optical signal of the wavelength λ1. This process is implemented by turning on an MEMS connected to the second port b2. When the wavelength of the optical signal received by the first port a2 of the optical adjustment unit is λ2, the optical adjustment unit transmits the optical signal by using the second port c2 configured to transmit the optical signal of the wavelength λ2. This process is implemented by turning on an MEMS connected to the second port c2. When the wavelength of the optical signal received by the first port a2 of the optical adjustment unit is A3, the optical adjustment unit transmits the optical signal by using the second port d2 configured to transmit the optical signal of the wavelength λ3. This process is implemented by turning on an MEMS connected to the second port d2.

In this embodiment of this application, when the optical path is configured in the optical switch network 103 to configure communication relationships between the communication nodes in the communication system, the MEMS of the optical adjustment unit in the optical switch network 103 may be controlled, to adjust an optical path direction of an optical signal output by the optical adjustment unit, to adjust connection relationships in the optical switch network 103. Because each MEMS of the optical adjustment unit can fast adjust an optical path direction of one channel of optical signal output by the AWG, complexity of configuring the optical path in the optical switch network 103 can be effectively simplified, thereby improving efficiency of configuring the optical path.

A second optional implementation is shown in FIG. 8. FIG. 8 is a schematic diagram of a structure of yet another communication system according to an embodiment of this application. When a routing table is used to record a correspondence between a destination communication node and an input port of an optical switch network, different optical paths 103*b* (which are dashed parts in FIG. 8) that are in one-to-one correspondence with different input ports I2 are configured in the optical switch network 103. Each optical path 103*b* corresponds to one destination communication node. In this way, an input port I2 of the optical switch network 103 corresponds to a destination communication node, to ensure that after a first transmitter transmits optical signals to different input ports I2, the optical signals received by the optical switch network 103 from the different input ports I2 can be transmitted on different optical paths, so that the optical signals are transmitted to different destination communication nodes by using different receivers 102. It should be noted that in FIG. 8, an example in which each output port O2 of the optical switch network 103 is connected to a different receiver 102 is used for description. In another possible implementation, two or more output ports O2 of the optical switch network 103 are all connected to one receiver 102. A connection relationship between the optical switch network 103 and the receiver 102 is not limited in this embodiment of this application.

It is assumed that a first source communication node sends data information to a first destination communication node. In this case, after receiving a second electrical signal that is sent by the first source communication node and that carries the data information, the first transmitter may perform the following steps to transmit a target optical signal.

B1: Determine a target input port based on a first destination communication node and the routing table.

In this embodiment of this application, there are a plurality of implementations of the routing table in the communication system. The following two implementations are used as examples for description below.

In a first implementation, each transmitter 101 in the communication system 10 obtains a same routing table. The routing table is used to record a correspondence between an identifier of a transmitter, an identifier of a destination communication node, and an identifier of an input port of the optical switch network. In this case, the first transmitter may query the routing table based on the identifier of the transmitter and an identifier of the first destination communication node, to obtain a corresponding target input port.

In a first case, a plurality of transmitters in the communication system are connected to a plurality of source communication nodes in one-to-one correspondence. In this case, a transmitter may uniquely determine a source communication node connected to the transmitter. In this way, the routing table may be used to record the correspondence between an identifier of a transmitter, an identifier of a destination communication node, and an identifier of an input port of the optical switch network. For example, for the correspondence recorded in the routing table, refer to the following Table 6.

TABLE 6

| Identifier of the transmitter | Identifier of the input port of the optical switch network | Identifier of the destination communication node |
|---|---|---|
| M1 | D1 | P1 |
| M1 | D2 | P2 |
| M2 | D3 | P3 |

Using the first row in Table 6 as an example, the identifier of the transmitter is M1, the identifier of the destination communication node is P1, and an identifier of a corresponding input port of the optical switch network is D1. Assuming that the transmitter M1 is connected to a source communication node P0, it indicates that if the source communication node of the optical signal is P0 and the destination communication node is P1, the transmitter M1 transmits an optical signal to the input port D1 of the optical switch network.

In a second case, at least one transmitter in the communication system is connected to the plurality of source communication nodes. In this case, the routing table may be used to record a correspondence between an identifier of a transmitter, an identifier of a source communication node, an identifier of a destination communication node, and an identifier of an input port of the optical switch network. For example, for the correspondence recorded in the routing table, refer to the following Table 7.

TABLE 7

| Identifier of the transmitter | Identifier of the input port of the optical switch network | Identifier of the source communication node | Identifier of the destination communication node |
|---|---|---|---|
| M1 | D1 | P0 | P1 |
| M1 | D2 | P0 | P2 |
| M2 | D3 | P1 | P3 |

Using the second row in Table 7 as an example, the identifier of the transmitter is M1, the identifier of the source communication node is P0, the identifier of the destination communication node is P2, and an identifier of a corresponding input port of the optical switch network is D1. In this case, it indicates that if the source communication node of the optical signal is P0 and the destination communication node is P2, the transmitter M1 transmits an optical signal to the input port D1 of the optical switch network.

In a second implementation, each transmitter 101 in the communication system 10 obtains a different routing table, the routing table obtained by each transmitter 101 corresponds to the transmitter, and the routing table corresponding to each transmitter is used to record a correspondence between an identifier of a destination communication node and an identifier of an input port of the optical switch network. In this case, the first transmitter may first obtain a routing table corresponding to the first transmitter. It is assumed that the routing table is a first routing table. The first routing table is used to record a correspondence between an identifier of a destination communication node and an identifier of an input port of the optical switch network. Then the first transmitter queries the first routing table by using an identifier of the first destination communication node, to obtain a corresponding target input port.

In a first case, a plurality of transmitters in the communication system are connected to a plurality of source communication nodes in one-to-one correspondence. In this case, a transmitter may uniquely determine a source communication node connected to the transmitter. Using the first routing table as an example, the first routing table may be used to record the correspondence between an identifier of a destination communication node and an identifier of an input port of the optical switch network. For example, for the correspondence recorded in the first routing table, refer to the following Table 8.

TABLE 8

| Identifier of the input port of the optical switch network | Identifier of the destination communication node |
|---|---|
| D1 | P1 |
| D2 | P2 |
| D3 | P3 |

Using the first row in Table 8 as an example, the identifier of the destination communication node is P1, and an identifier of a corresponding input port of the optical switch network is D1. Assuming that the first transmitter is connected to the source communication node P0, it indicates that if the source communication node of the signal is P0 and the destination communication node is P1, the first transmitter transmits an optical signal to the input port D1 of the optical switch network.

In a second case, at least one transmitter in the communication system is connected to a plurality of source communication nodes. In this case, assuming that the first transmitter is connected to a plurality of source communication nodes, the first routing table may be used to record a correspondence between an identifier of a source communication node, an identifier of a destination communication node, and an identifier of an input port of the optical switch network. For example, for the correspondence recorded in the first routing table, refer to the following Table 9.

TABLE 9

| Identifier of the input port of the optical switch network | Identifier of the source communication node | Identifier of the destination communication node |
|---|---|---|
| D1 | P0 | P1 |
| D2 | P0 | P2 |
| D3 | P1 | P3 |

Using the second row in Table 9 as an example, the identifier of the source communication node is P0, the identifier of the destination communication node is P2, and the identifier of a corresponding input port of the optical switch network is D2. In this case, it indicates that if the source communication node of the optical signal is P0 and the destination communication node is P2, the first transmitter transmits an optical signal to the input port D2 of the optical switch network.

In the foregoing two implementations, in different communication scenarios, in addition to corresponding to the destination communication node, the target input port of the optical switch network may also have a correspondence with another communication parameter. In this case, the routing table may record a correspondence between another communication parameter, a destination communication node, and an input port of the optical switch network. The first transmitter queries the routing table by using the obtained another communication parameter and the identifier of the first destination communication node, to obtain a corresponding target input port.

For example, the another communication parameter is a slot. In this case, using the second case in the foregoing second implementation as an example, the first routing table may be further used to record a correspondence between a slot, an identifier of a source communication node, an identifier of a destination communication node, and an identifier of an input port of the optical switch network. For example, for the correspondence recorded in the first routing table, refer to the following Table 10.

TABLE 10

| Slot | Identifier of the input port of the optical switch network | Identifier of the source communication node | Identifier of the destination communication node |
|---|---|---|---|
| T1 | D1 | P0 | P1 |
| T2 | D2 | P0 | P2 |
| T3 | D3 | P0 | P3 |

Using the third row in Table 10 as an example, the slot is T3, the identifier of the source communication node is P0, the identifier of the destination communication node is P3, and an identifier of a corresponding input port of the optical switch network is D3. In this case, it indicates that if the source communication node is P0 and the destination communication node is P3, the first transmitter transmits an optical signal to the input port D3 of the optical switch network in the communication slot T3.

B2: Convert a received first electrical signal into a target optical signal, and then send the target optical signal to the target input port of the optical switch network.

For example, the first transmitter may directly modulate intensity of the optical signal based on the received first electrical signal, to obtain the target optical signal. Alternatively, coherent modulation is performed on the optical signal based on the received first electrical signal, to obtain the target optical signal. For example, the coherent modulation is QPSK modulation. The foregoing modulation scheme is not limited in this embodiment of this application.

In this way, after the target input port of the optical switch network receives the optical signal transmitted by the first transmitter, the optical switch network can transmit the target optical signal through an optical path corresponding to the target input port, to send the target optical signal to the first receiver through an optical fiber. Subsequently, after receiving the target optical signal, the first receiver may convert the target optical signal into a second electrical signal, and then send the second electrical signal to the first destination communication node.

In this embodiment of this application, there are a plurality of manners in which the transmitter transmits optical signals to different input ports of the optical switch network. In this embodiment of this application, the following two signal transmission manners are used as examples for description.

Figure 9:
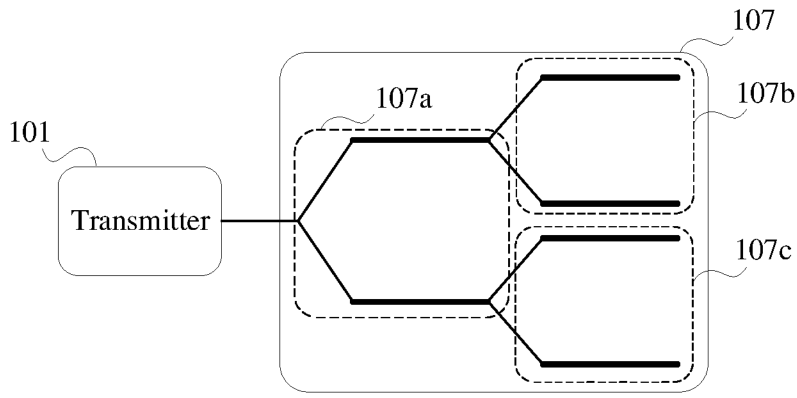
FIG. 9 is a schematic diagram of a connection between a first transmitter and an optical switch network according to an embodiment of this application.

A first signal transmission manner is shown in FIG. 9. FIG. 9 is a schematic diagram of a connection between a first transmitter and an optical switch network according to an embodiment of this application. The communication system 10 may further include a 1*N optical switching unit 107. The 1*N optical switching unit has one input port and a plurality of output ports. The 1*N optical switching unit 107 is configured to select an output port from the plurality of output ports of the 1*N optical switching unit to output an optical signal. An output port of the first transmitter is connected to the input port of the 1*N optical switching unit 107. Each output port of the 1*N optical switching unit 107 is connected to one input port I2 of the optical switch network 103. In this way, the first transmitter can control the 1*N optical switching unit 107 to select an output port connected to the target input port to output the target optical signal, to enable the target optical signal to be transmitted to the target input port of the optical switch network 103.

For example, the 1*N optical switching unit 107 may be a Mach-Zehnder interferometer (MZI) matrix. The MZI matrix may include a plurality of MZI optical switching units. Each MZI optical switching unit has one input port and two output ports. For example, the plurality of MZI optical switching units are respectively an MZI optical switching unit **107*a*, an MZI optical switching unit 107*b*, and an MZI optical switching unit 107*c*. An input port of the MZI optical switching unit 107*a* is connected to the first transmitter. Two output ends of the MZI optical switching unit 107*a* are respectively connected to an input port of the MZI optical switching unit 107*b* and an input end of the MZI optical switching unit 107*c*. Two output ports of the MZI optical switching unit 107***b* and two output ports of the MZI optical switching unit 108*c* are respectively connected to four input ports I2 of the optical switch network 103. The first transmitter can control the plurality of MZI optical switching units, so that the target optical signal input from the input port of the MZI optical switching unit 107*a* can be output from one output port of the MZI optical switching unit 107*b* and the MZI optical switching unit 107*c*.

Figure 10:
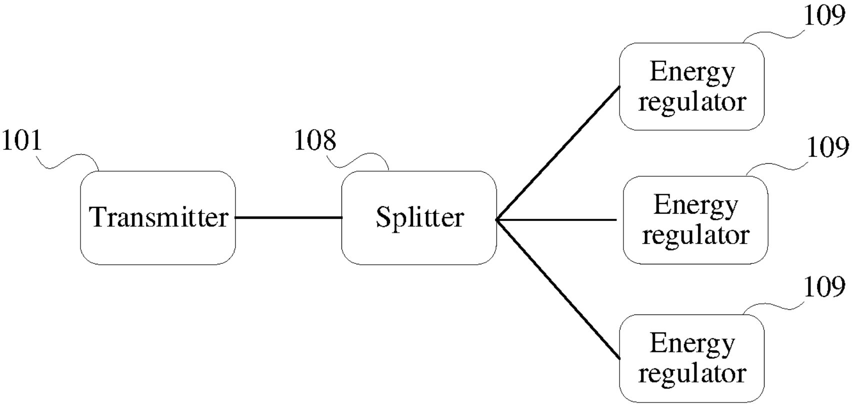
FIG. 10 is another schematic diagram of a connection between a first transmitter and an optical switch network according to an embodiment of this application.

A second signal transmission manner is shown in FIG. 10. FIG. 10 is a schematic diagram of another connection between a first transmitter and an optical switch network according to an embodiment of this application. The communication system 10 may further include a splitter 108 and a plurality of energy regulators 109. The splitter 108 has an input port and a plurality of output ports. The input port of the splitter 108 may be connected to the first transmitter. The plurality of output ports of the splitter 108 may be respectively connected to the energy regulators 109. The plurality of energy regulators 109 are respectively connected to a plurality of input ports I2 of the optical switch network 103. The splitter 108 is configured to split an optical signal input by the first transmitter into a plurality of channels of optical signals, and send the plurality of channels of optical signals to the plurality of energy regulators 109 respectively. The plurality of channels of optical signals are in one-to-one correspondence with the plurality of output ports of the splitter 108. Energy (which also referred to as optical intensity) of the plurality of channels of optical signals is usually equal. Each energy regulator 109 is configured to adjust energy of the optical signal sent by the splitter 108. In this way, the first transmitter can control the plurality of energy regulators 109, to enable the target optical signal to be sent to the target input port of the optical switch network 103.

The first transmitter can control the plurality of energy regulators 109 to adjust energy of an optical signal on an optical path on which the controlled energy regulator is located, for example, increase or decrease energy, so that an optical path connected to the target input port of the optical switch network 103 is enabled. An optical signal transmitted on the optical path is the target optical signal, and another optical path is disabled, so that the target optical signal is sent to the target input port of the optical switch network 103.

For example, the energy regulator 109 may include an optical amplifier (optical amplifier, OA) and/or a variable optical attenuator (VOA). For example, the OA may be a semiconductor optical amplifier (SOA). Therefore, this application describes a working principle of the energy regulator 109 by using the following three manners as examples.

In a first manner, when each energy regulator 109 in the communication system 10 is an SOA, assuming that the optical intensity of the optical signal received by the splitter 108 is 3 decibel-milliwatts (dBm), the splitter 108 can equally divide the optical signal received by the splitter 108 into three parts of optical signals with same optical intensity, and respectively transmit the three parts of optical signals to three energy regulators 109. That is, the intensity of the optical signal received by each energy regulator 109 is 1 dBm. If only an optical signal with intensity higher than 1.5 dBm can be transmitted to the input port of the optical switch network 103, the first transmitter may control the three energy regulators 109, so that an energy regulator 109 connected to the target input port increases the intensity of the optical signal received by the energy regulator 109 to 2 dBm, to obtain the target optical signal. In other words, the optical intensity of the target optical signal is 2 dBm, and the target optical signal can be transmitted to the target input port of the optical switch network 103.

In a second manner, when each energy regulator 109 in the communication system 10 is a VOA, assuming that the optical intensity of the optical signal received by the splitter 108 is 3 dBm, the splitter 108 can equally divide the optical signal received by the splitter 108 into three parts of optical signals with same optical intensity, and respectively transmit the three parts of optical signals to three energy regulators 109. That is, the intensity of the optical signal received by each energy regulator 109 is 1 dBm. If only an optical signal with intensity higher than 0.8 dBm can be transmitted to the input port of the optical switch network 103, the first transmitter may control the three energy regulators 109, so that an energy regulator 109 not connected to the target input port can attenuate the intensity of the optical signal received by the energy regulator 109 to 0 dBm. In this way, the optical signal received by the energy regulator 109 connected to the target input port is the target optical signal. In other words, the optical intensity of the target optical signal is 1 dBm, and the target optical signal can be transmitted to the target input port of the optical switch network 103.

In a third manner, when each energy regulator 109 in the communication system 10 includes a VOA and an SOA, assuming that the optical intensity of the optical signal received by the splitter 108 is 3 dBm, the splitter 108 can equally divide the optical signal received by the splitter 108 into three parts of optical signals with same optical intensity, and respectively transmit the three parts of optical signals to three energy regulators 109. That is, the intensity of the optical signal received by each energy regulator 109 is 1 dBm. If only an optical signal with intensity higher than 1 dBm can be transmitted to the input port of the optical switch network 103, the first transmitter may control the three energy regulators 109, so that an energy regulator 109 connected to the target input port can increase the intensity of the optical signal received by the energy regulator 109 to 1.5 dBm, and an energy regulator 109 not connected to the target input port can attenuate the intensity of the optical signal received by the energy regulator 109 to 0 dBm. In this way, the optical signal output by the energy regulator 109 connected to the target input port is the target optical signal. In other words, the optical intensity of the target optical signal is 1.5 dBm, and the target optical signal can be transmitted to the target input port of the optical switch network 103.

It can be learned from the foregoing two signal transmission manners that each transmitter 101 in the communication system 10 may be connected to the plurality of input ports 12 in the optical switch network 103. For example, each transmitter 101 may be connected to the plurality of input ports I2 in the optical switch network 103 through a plurality of channels of optical fibers. In FIG. 8, each receiver 102 in the communication system 10 may be connected to one output port O2 in the optical switch network 103. For example, each receiver 102 may be connected to one output port O2 in the optical switch network 103 through one channel of optical fiber. For example, after the first transmitter determines the target input port, the first transmitter does not need to transmit an optical signal of a specified wavelength, and only needs to transmit, through fast adjustment of the optical switching unit (for example, the MZI optical switching unit or the energy regulator), the optical signal to one channel of optical fiber connected to the target input port. In this way, efficiency of controlling the optical switching unit by the first transmitter is far higher than efficiency of adjusting the optical signal of the specified wavelength transmitted by the first transmitter. Therefore, efficiency of transmitting, by the first transmitter, the target optical signal to a target input port of the optical switch network 103 is high, and a transmission latency is low.

In this embodiment of this application, there are a plurality of implementations of a structure of the optical switch network 103. In this embodiment of this application, the following two implementations are used as examples for description.

Figure 11:
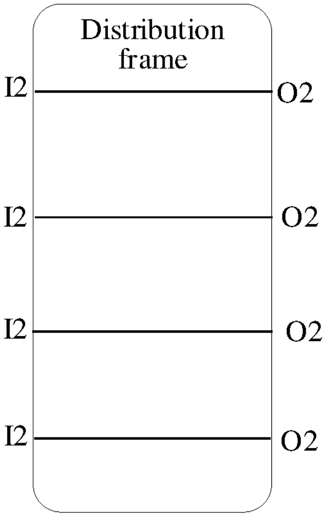
FIG. 11 is a schematic diagram of a structure of a distribution frame according to an embodiment of this application.

In a first implementation, the optical switch in the optical switch network 103 includes a distribution frame. In this case, the optical switch network 103 may be a network formed by connecting a plurality of distribution frames. FIG. 11 is a schematic diagram of a structure of a distribution frame according to an embodiment of this application. The distribution frame has a plurality of input ports I2 and a plurality of output ports O2. Each input port I2 of the distribution frame is configured to be connected to one transmitter or an output port O2 of another distribution frame. Each output port O2 of the distribution frame is configured to be connected to one receiver or an input port I2 of another distribution frame. Each input port I2 of the distribution frame is connected to each output port O2 of the distribution frame through an optical fiber. Two distribution frames may also be connected through an optical fiber. An optical fiber between one input port I2 and one output port O2 of the distribution frame is at least a part of an optical path.

In this embodiment of this application, because the optical path in the optical switch network 103 includes the optical fiber disposed in the distribution frame and the optical fiber connected between the two distribution frames, when the optical path is configured in the optical switch network 103 to configure communication relationships between communication nodes in the communication system, the optical fiber may be inserted or removed in a manual manner or a mechanical arm control manner during adjustment of the distribution frame, to adjust a connection relationship between each input port I2 and each output port O2 in the distribution frame.

Figure 12:
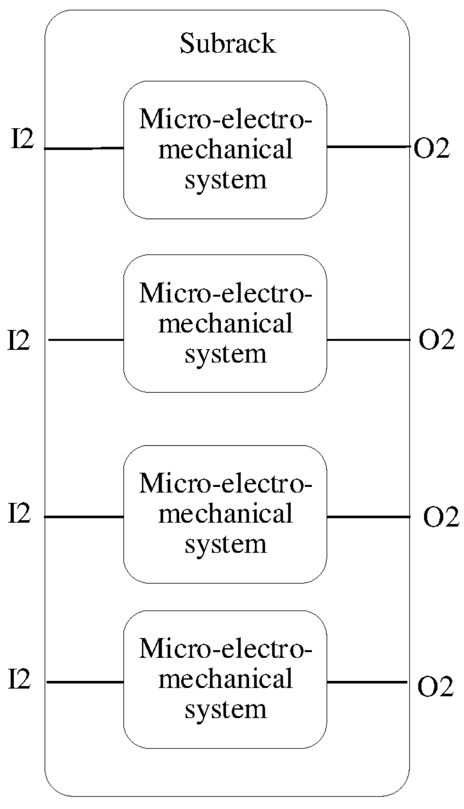
FIG. 12 is a schematic diagram of a structure of a subrack and a plurality of optical switching units located in the subrack according to an embodiment of this application.

In a second implementation, each optical switch in the optical switch network 103 includes a subrack and a plurality of optical switching units. In this case, the optical switch network 103 may be a network formed by connecting a plurality of subracks. FIG. 12 is a schematic diagram of a structure of a subrack and a plurality of optical switching units located in the subrack according to an embodiment of this application. The subrack has a plurality of input ports I2 and a plurality of output ports O2. Each input port I2 of the subrack is connected to each output port O2 of the subrack by using one or more optical switching units. For example, the optical switching unit may be an MEMS, and can adjust an optical path direction of an optical signal input from the input port I2 of the subrack. Each input port I2 of the subrack is configured to be connected to one transmitter or an output port O2 of another subrack. Each output port O2 of the subrack is configured to be connected to a receiver or an input port I2 of another subrack. Two subracks may be connected through an optical fiber. An MEMS between one input port I2 and one output port O2 of the subrack is at least a part of an optical path. It should be noted that the input port I2 of the subrack may be connected to the MEMS through an optical fiber, and the output port O2 of the subrack may also be connected to the MEMS through an optical fiber.

In this embodiment of this application, because the optical path in the optical switch network 103 includes the MEMS disposed in the subrack, when the optical path is configured in the optical switch network 103 to adjust communication relationships between communication nodes in the communication system, the MEMS in the optical switch network 103 may be controlled, to adjust an optical path direction of an optical signal input from the input port I2 in the subrack, to adjust a connection relationship between each input port I2 and each output port O2 in the subrack. Because each MEMS in the optical switch network 103 can fast adjust an optical path direction in the subrack, complexity of configuring the optical path in the optical switch network 103 can be effectively simplified, thereby improving efficiency of configuring the optical path.

In the two implementations of the optical switch network 103 provided above, each input port I2 of the optical switch network 103 is connected to one output port O2 only through the optical fiber and the MEMS. Therefore, there are a small quantity of optical components in the optical switch network 103, and an insertion loss caused during optical signal transmission is small, so that signal transmission quality is effectively improved.

It should be noted that, in the foregoing first optional implementation, the optical path configured in the optical switch network 103 may correspond to a wavelength of an optical signal transmitted by the transmitter. In the foregoing second optional implementation, the optical path configured in the optical switch network 103 may correspond to the input port that is of the optical switch network 103 and that receives the optical signal. In another optional implementation, the first optional implementation may alternatively be combined with the second optional implementation. In other words, the optical path configured in the optical switch network 103 may be identified by using the wavelength transmitted by the transmitter and the input port of the optical switch network. In this way, after the transmitter transmits optical signals of different wavelengths to different input ports of the optical switch network 103, the optical switch network 103 may transmit the optical signals through different optical paths.

With reference to the foregoing embodiments, each transmitter 101 in the communication system 10 may store a pre-configured routing table. The plurality of optical paths in the optical switch network 103 in the communication system 10 are configured based on the routing table. Each receiver 102 in the communication system 10 may store a routing table or may not store a routing table. For example, when each receiver 102 is connected to only one destination communication node 105, the receiver 102 does not need to store a routing table. After receiving an optical signal and converting the optical signal into a second electrical signal, the receiver 102 directly sends the second electrical signal to the destination communication node 105. For another example, when each receiver 102 is connected to a plurality of destination communication nodes 105, the receiver 102 may store a routing table. After the receiver 102 receives an optical signal and converts the optical signal into a second electrical signal, the receiver 102 may query the routing table to determine a destination communication node that is to receive the second electrical signal, and then send the electrical signal to the found destination communication node.

Figure 13:
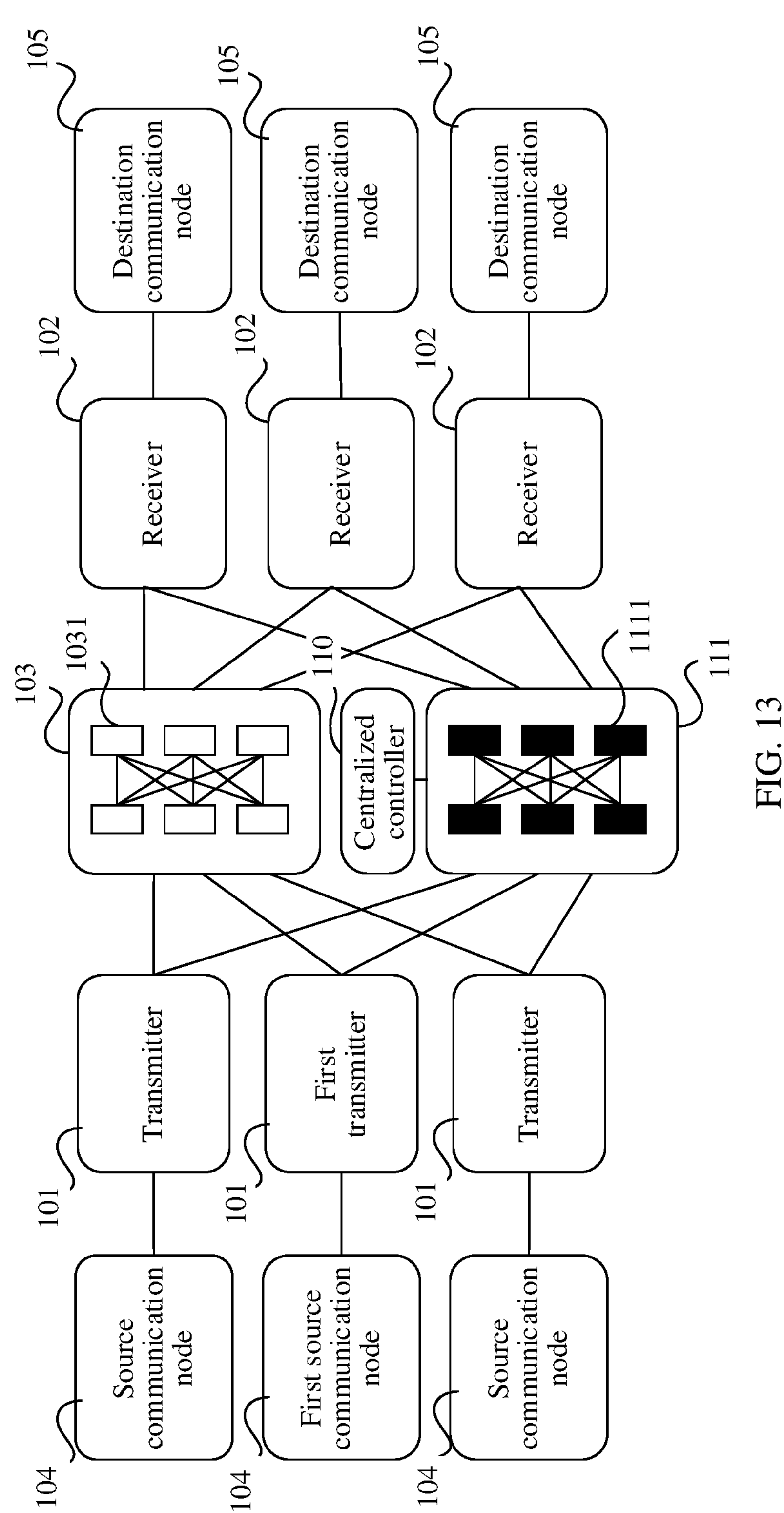
FIG. 13 is a schematic diagram of a structure of a communication system according to another embodiment of this application.

It can be known from the foregoing embodiments that, before communication is performed between the communication nodes in the communication system 10, the communication system 10 may obtain the routing table. For example, FIG. 13 is a schematic diagram of a structure of a communication system according to another embodiment of this application. The communication system 10 may further include a centralized controller 110. The centralized controller 110 may be integrated into a server. The centralized controller 110 is configured to generate, based on communication relationships between a plurality of source communication nodes 104 and a plurality of destination communication nodes 105, a routing table used to record an optical path from a source communication node 104 to a destination communication node 105.

For example, the centralized controller 110 may obtain the communication relationships between the plurality of source communication nodes 104 and the plurality of destination communication nodes 105 based on a pre-obtained collective communication library. The collective communication library is used to store a communication algorithm set. For example, the communication algorithm set may include a ring communication algorithm or a half or doubling (Half/Doubling) communication algorithm.

Figures 14, 15, 16:
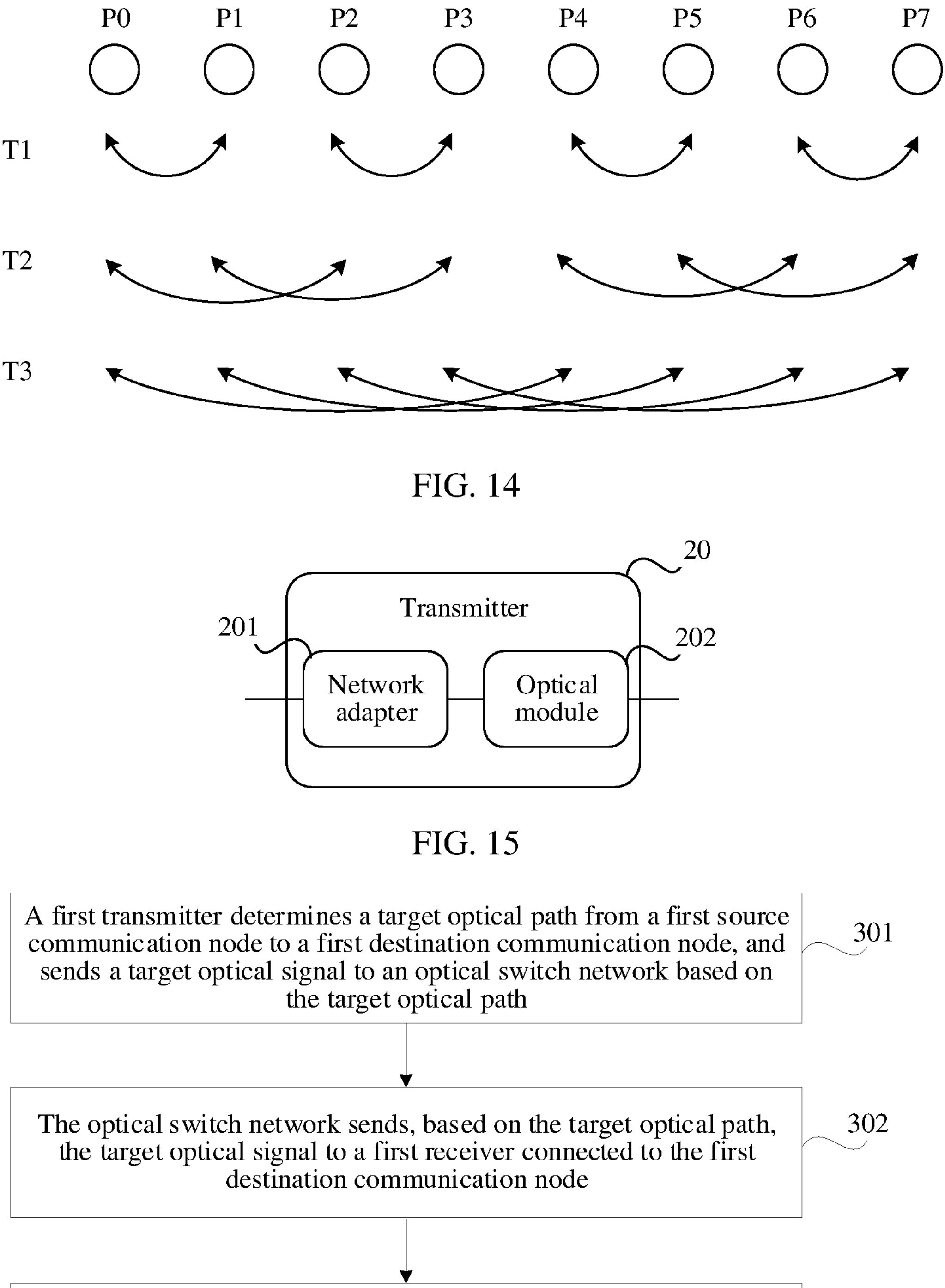
FIG. 14 is a diagram of communication relationships between communication nodes according to an embodiment of this application.
FIG. 15 is a schematic diagram of a structure of a transmitter according to an embodiment of this application.
FIG. 16 is a schematic flowchart of a communication method according to an embodiment of this application.

For example, FIG. 14 is a diagram of communication relationships between communication nodes according to an embodiment of this application. For a communication node P0 to a communication node P7, in a slot T1, the communication node P0 communicates with the communication node P1, the communication node P2 communicates with the communication node P3, the communication node P4 communicates with the communication node P5, and the communication node P6 communicates with the communication node P7. In a slot T2, the communication node P0 communicates with the communication node P2, the communication node P1 communicates with the communication node P3, the communication node P4 communicates with the communication node P6, and the communication node P5 communicates with the communication node P7. In a slot T3, the communication node P0 communicates with the communication node P4, the communication node P1 communicates with the communication node P5, the communication node P2 communicates with the communication node P6, and the communication node P3 communicates with the communication node P7. It should be noted that, in the slot T1, for the communication node P0 and the communication node P1, if the communication node P0 sends data information to the communication node P1, the communication node P0 is a source communication node, and the communication node P1 is a destination communication node. If the communication node P1 sends data information to the communication node P0, the communication node P1 is a source communication node, and the communication node P0 is a destination communication node. Relationships between the communication nodes in another slot are similar to this. Details are not described herein again. If the centralized controller 110 generates a routing table based on the communication relationships between the communication nodes shown in FIG. 14, for a part of content in the routing table generated by the centralized controller 110, refer to the foregoing Table 5 or Table 10.

In this embodiment of this application, after generating the routing table, the centralized controller 110 may further deliver the routing table generated by the centralized controller 110 to each transmitter. In addition, the centralized controller 110 may control the optical switch network 103 to establish the optical path in the optical switch network 103 based on the routing table. It should be noted that, for a manner of establishing the optical path by the optical switch network 10, refer to related content of configuring the optical path in the optical switch network 103 in the foregoing embodiments. Details are not described herein again in this application.

As shown in FIG. 13, the communication system 10 may further include an electrical switch network 11. The electrical switch network 11 may include a plurality of electrical switches 1111. Each transmitter 101 and each receiver in the communication system 10 may be further connected to the electrical switch network 111. After generating the routing table, the centralized controller 110 may send the routing table to each transmitter 101 by using the electrical switch network 111, or may send the routing table to each receiver 102.

It should be noted that, when the routing table is sent to the transmitters 101 by using the electrical switch network 111, content of the routing table received by each transmitter 101 or each receiver 102 may be the same or may be different. For detailed information included in the routing table, refer to corresponding content in the foregoing embodiments. Details are not described herein again in this application.

In this embodiment of this application, because each transmitter 101 and each receiver 102 are connected to the electrical switch network 111, the first transmitter may send control information by using the electrical switch network 111. For example, before a first source communication node communicates with a first destination communication node, the first source communication node communicates and performs handshake with the first destination communication node. In this process, the first transmitter may send control information related to the handshake to the electrical switch network 111. In this embodiment of this application, for the first source communication node and the first destination communication node, data information is transmitted by using the optical switch network 103. Because optical-to-electrical conversion does not need to be performed in the optical switch network 103, it is ensured that a communication latency of data information transmission between a transmitting end and a receiving end is low, which is usually less than 10 nanoseconds. The control information is transmitted by using the electrical switch network 111. Because the electrical switch network 111 does not need to transmit the data information, a structure of the electrical switch network 111 may be simplified compared with a structure of a conventional electrical switch network, to ensure a low communication latency of control information transmission between the transmitting end and the receiving end.

Optionally, a distribution architecture of a plurality of optical switches in the optical switch network 103 may be the same as a distribution architecture of a plurality of electrical switches 1111 in the electrical switch network 11. For example, each distribution architecture may be a fat tree structure (FatTree). The fat tree structure is a re-arrangeable non-blocking network structure used to connect a plurality of switches, and is a variant structure of a tree structure.

In the foregoing embodiments, an example in which an optical communication system includes both an optical switch network and an electrical switch network is used for description. The optical switch network is used to transmit data information, and the electrical switch network is used to transmit control information. In this way, downward compatibility of the optical communication system is implemented. In addition, efficiency of transmitting the data information and the control information is effectively improved. During actual implementation of this embodiment of this application, the optical communication system may alternatively include only an optical switch network.

The optical switch network is used to transmit both data information and control information. In this case, the first electrical signal received by the foregoing transmitter may carry both data information and control information.

In a conventional communication system, each transmitter and each receiver are connected to one input port of a switch through one optical fiber. In this way, transmission bandwidths of each transmitter and each receiver are limited. However, in this embodiment of this application, each transmitter 101 and each receiver 102 may be connected to one input port of the optical switch network 103 through one channel of optical fiber. The channel of optical fiber may include at least two optical fibers. In addition, each optical fiber in the channel of optical fiber can transmit an optical signal of a specific bandwidth. In this way, a transmission bandwidth of the transmitter is large, so that efficiency of transmitting the optical signal is effectively improved.

For example, during network deployment of the communication system, a quantity of optical fibers in one channel of optical fiber connected to the transmitter and/or a quantity of optical fibers in one channel of optical fiber connected to the receiver may be adjusted based on transmission bandwidth requirements/a transmission bandwidth requirement of the transmitter and/or the receiver, to improve communication flexibility between the communication nodes and adjust the quantity of optical fibers. In addition, after the network deployment of the communication system, a staff member may continue to increase, based on a change of a communication environment or a communication requirement, a quantity of optical fibers connected to the transmitter and/or a quantity of optical fibers connected to the receiver, to ensure that a bandwidth meets a requirement and implement dynamic capacity expansion, so as to improve communication flexibility between the communication nodes.

In an optional manner, in the communication system, point-to-point transmission between the source communication node and the destination communication node can be implemented by configuring the optical path. A pair of the source communication node and the destination communication node may correspond to one dedicated optical path. In this way, it is ensured that communication between the two communication nodes is not interfered by another communication node, and a problem of congestion of an optical signal transmitted in the optical switch network is avoided.

It is worth noting that the communication system provided in this embodiment of this application may support communication performed by using a time division multiple access (TDMA) technology, a code division multiple access (CDMA) technology, or a frequency division multiple access (FDMA) technology, provided that it is ensured that the transmitter and the receiver meet bandwidths required by the foregoing technologies.

In the conventional communication system, a switch network (that is, an electrical switch network) selects a communication path, and the switch network further performs optical-to-electrical conversion at least once and electrical-to-optical conversion at least once. Therefore, the switch network performs a large quantity of processing actions, and a load balancing algorithm is used when a path is selected, to avoid excessive processing pressure of each switch in the switch network. However, execution of the load balancing algorithm further affects a signal transmission latency of the switch network, resulting in a poor signal transmission effect of the switch network. However, in this embodiment of this application, the optical switch network does not need to select a communication path, but only needs to transmit an optical signal through a pre-configured optical path. In this way, the optical switch network does not need to perform load balancing, and a signal transmission latency is correspondingly reduced, so that a signal transmission effect of the switch network is good.

With reference to the foregoing embodiments, the communication system 10 may be a data center network. Each time a computing task (for example, a facial recognition task or a language recognition task) is executed by using the data center network, the communication relationships between the communication nodes may be first obtained, and the routing table is generated based on the relationships. Then, the routing table is delivered to each transmitter, and the optical switch network is controlled to establish an optical path. Finally, each source communication node may transmit the data information to a corresponding destination communication node by using the transmitter, the optical switch network, and the receiver.

FIG. 15 is a schematic diagram of a structure of a transmitter according to an embodiment of this application. A transmitter 20 may be applied to the foregoing communication system 10. The transmitter 20 may include a network adapter 201 and an optical module 202 connected to the network adapter 201. For ease of description, an example in which the transmitter 20 is the first transmitter in the foregoing embodiment is used herein for description.

The network adapter 201 is configured to determine a target optical path from a first source communication node to a first destination communication node. The optical module 202 is configured to send a target optical signal to an optical switch network based on the target optical path, to enable the optical switch network to send, based on the target optical path, the target optical signal to a first receiver connected to the first destination communication node. The target optical signal is obtained by converting a first electrical signal sent by the first source communication node.

For example, the network adapter 201 may store a routing table. The routing table is used to record an optical path from a source communication node to a destination communication node. For detailed content recorded in the routing table, refer to Table 1 to Table 10 in the foregoing embodiments. The network adapter 201 is configured to determine the target optical path from the first source communication node to the first destination communication node based on the routing table.

In this embodiment of this application, the network adapter 201 can receive the first electrical signal sent by the first source communication node, and process the first electrical signal (for example, convert a digital signal into an analog signal). The optical module 202 can convert the first electrical signal processed by the network adapter 201 into the target optical signal.

In an implementation, the routing table is used to record a correspondence between a destination communication node and a wavelength. Different optical paths that are in one-to-one correspondence with optical signals of different wavelengths transmitted by the transmitter are configured in the optical switch network. Each optical path corresponds to one destination communication node. The network adapter 201 is configured to determine a target wavelength based on the first destination communication node and the routing table.

In one case, the transmitter is connected to a light source pool. The light source pool is used to provide optical signals of different wavelengths for the transmitter. The network adapter 201 is configured to select an optical signal of the target wavelength from the optical signals provided by the light source pool. Optionally, the light source pool may be further integrated into the transmitter.

In another case, the transmitter has a tunable laser. The tunable laser may be packaged in the optical module 202. The network adapter 201 is configured to control the tunable laser to emit an optical signal of the target wavelength.

The optical module 202 is configured to modulate the optical signal of the target wavelength based on the received first electrical signal, to obtain the target optical signal. For example, the transmitter may further include a modulator. The modulator may be packaged in the optical module 202. The optical module 202 is configured to modulate the optical signal of the target wavelength based on the received first electrical signal by using the modulator, to obtain the target optical signal.

In another implementation, the routing table is used to record a correspondence between a destination communication node and an input port of the optical switch network. Different optical paths that are in one-to-one correspondence with different input ports are configured in the optical switch network. Each optical path corresponds to one destination communication node. The network adapter 201 is configured to determine a target input port based on the first destination communication node and the routing table. The optical module 202 is configured to send the target optical signal to the target input port of the optical switch network.

Optionally, the first electrical signal sent by the first source communication node carries data information. The optical module 202 is further configured to send control information by using an electrical switch network.

For a working principle and a corresponding effect of the transmitter, refer to a working principle and a corresponding effect of the transmitter in the foregoing communication system. Details are not described in this embodiment of this application again.

FIG. 16 is a schematic flowchart of a communication method according to an embodiment of this application. The communication method may be applied to the communication system shown in FIG. 1, FIG. 2, FIG. 3, and FIG. 8 to FIG. 13. In addition, for ease of description, the communication method disclosed in the following embodiments is described by using communication between a first transmitter and a first receiver as an example. As shown in FIG. 16, the method includes the following steps.

S301: The first transmitter determines a target optical path from a first source communication node to a first destination communication node, and sends a target optical signal to an optical switch network based on the target optical path.

Herein, the first source communication node is connected to the first transmitter. The target optical signal is obtained by converting a first electrical signal sent by the first source communication node. The first electrical signal may carry data information. The optical switch network includes one or more optical switches. A plurality of optical paths are configured in the optical switch network.

In this embodiment of this application, the first transmitter may determine the target optical path from the first source communication node to the first destination communication node based on a routing table. The routing table is used to record an optical path from a source communication node to a destination communication node. It should be noted that there are also a plurality of manners of recording, in the routing table, the optical path from the source communication node to the destination communication node. In this embodiment of this application, the following two aspects are used as examples for description.

In a first aspect, the routing table is used to record a correspondence between a target communication node and a wavelength. For the correspondence recorded in the routing table, refer to Table 1 to Table 5 in the foregoing embodiments. In this case, the first transmitter may obtain the target optical signal through the following steps.

C1: The first transmitter determines a target wavelength based on the first destination communication node and the routing table.

For step C1, refer to step A1 in the foregoing embodiments. Details are not described herein again in this embodiment of this application.

C2: The first transmitter modulates an optical signal of the target wavelength based on the received first electrical signal, to obtain the target optical signal.

There are a plurality of manners in which the first transmitter obtains the optical signal of the target wavelength. For example, the first transmitter may select an optical signal of the target wavelength from a light source pool. For another example, the first transmitter may emit an optical signal of the target wavelength by using a tunable laser. For a detailed working process and a related principle, refer to a corresponding part in the foregoing embodiments. For other content of step C2, refer to step A2 in the foregoing embodiments. Details are not described herein again in this embodiment of this application.

In a second aspect, the routing table is used to record a correspondence between a target communication node and an input port of the optical switch network. For the correspondence recorded in the routing table, refer to Table 6 to Table 10 in the foregoing embodiments. In this case, the first transmitter may transmit the target optical signal through the following steps.

Step D1: The first transmitter determines a target input port based on the first destination communication node and the routing table.

Step D2: The first transmitter converts the received first electrical signal into the target optical signal, and then sends the target optical signal to the target input port of the optical switch network.

For step D1, refer to step B1 in the foregoing embodiments, and for step D2, refer to step B2 in the foregoing embodiments. Details are not described herein again in this embodiment of this application. In addition, for a detailed process and a related principle of transmitting optical signals by the first transmitter to different input ports of the optical switch network, refer to a corresponding part in the foregoing embodiments.

Optionally, when the first transmitter is connected to one input port of the optical switch network through one channel of optical fiber, and the channel of optical fiber includes a plurality of optical fibers, a process in which the first transmitter transmits the target optical signal to the optical switch network may include the following.

The first transmitter performs slicing processing on the data information in the first electrical signal to obtain a plurality of data slices, and then generates one channel of optical sub-signal based on each data slice, to obtain a plurality of channels of optical sub-signals that are in one-to-one correspondence with the plurality of optical fibers. The target optical signal includes the plurality of channels of optical sub-signals. The first transmitter transmits the plurality of channels of optical sub-signals to the optical switch network through the plurality of optical fibers, so that each optical fiber can be used to transmit a corresponding channel of optical sub-signal. In this way, a bandwidth for transmitting the target optical signal between the first transmitter and the optical switch network is large, so that efficiency of transmitting the target optical signal is effectively improved.

S302: The optical switch network sends, based on the target optical path, the target optical signal to the first receiver connected to the first destination communication node.

In this embodiment of this application, when the manners of recording, in the routing table, the optical path from the source communication node to the destination communication node are different, the optical paths configured in the optical switch network are also different. In this embodiment of this application, the following two aspects are used as examples for description.

In a first aspect, when the routing table is used to record a correspondence between a target communication node and a wavelength, different optical paths that are in one-to-one correspondence with optical signals of different wavelengths transmitted by the first transmitter may be configured in the optical switch network, and each optical path corresponds to one destination communication node. For a structure and a working principle of the optical switch network, refer to related content in the first optional implementation in the foregoing embodiments.

In this case, after receiving the target optical signal sent by the first transmitter, the optical switch network may transmit the target optical signal through the target optical path corresponding to the target wavelength of the target optical signal, to send the target optical signal to the first receiver.

In a second aspect, when the routing table is used to record a correspondence between a target communication node and an input port of the optical switch network, different optical paths that are in one-to-one correspondence with different input ports of the optical switch network may be configured in the optical switch network, and each optical path corresponds to one destination communication node. For a structure and a working principle of the optical switch network, refer to related content in the second optional implementation in the foregoing embodiments.

In this case, after the target input port of the optical switch network receives the target optical signal sent by the first transmitter, the optical switch network can transmit the target optical signal through an optical path corresponding to the target input port, to send the target optical signal to the first receiver.

S303: The first receiver receives the target optical signal, converts the target optical signal into a second electrical signal, and then sends the second electrical signal to the first destination communication node.

For example, when the first receiver is connected to only one destination communication node, after receiving the target optical signal and converting the target optical signal into the second electrical signal, the first receiver directly sends the second electrical signal to the first destination communication node connected to the first receiver. When the first receiver is connected to a plurality of destination communication nodes, the first receiver may store the routing table. After receiving the target optical signal and converting the target optical signal into the second electrical signal, the first receiver may query the routing table to determine the first destination communication node that is to receive the first electrical signal, and then send the first electrical signal to the found first destination communication node.

In this embodiment of this application, when the communication system is the communication system shown in FIG. 13, before the foregoing step S301, the communication method may further include a centralized controller generates the routing table based on communication relationships between a plurality of source communication nodes and a plurality of destination communication nodes.

Optionally, the communication method may further include after generating the routing table, the centralized controller may establish a plurality of optical paths of the optical switch network based on the routing table. In addition, the centralized controller may further send the routing table to the first transmitter by using an electrical switch network. The first transmitter may store the routing table.

Optionally, the communication method may further include the first transmitter sends control information by using the electrical switch network.

It should be noted that a sequence of the steps of the optical communication method provided in this embodiment of this application may be appropriately adjusted, and the steps may also be correspondingly added or deleted based on a situation. All variant methods readily figured out by a person skilled in the art within the technical scope disclosed in this application shall fall within the protection scope of this application, and therefore are not described in detail.

Figure 17:
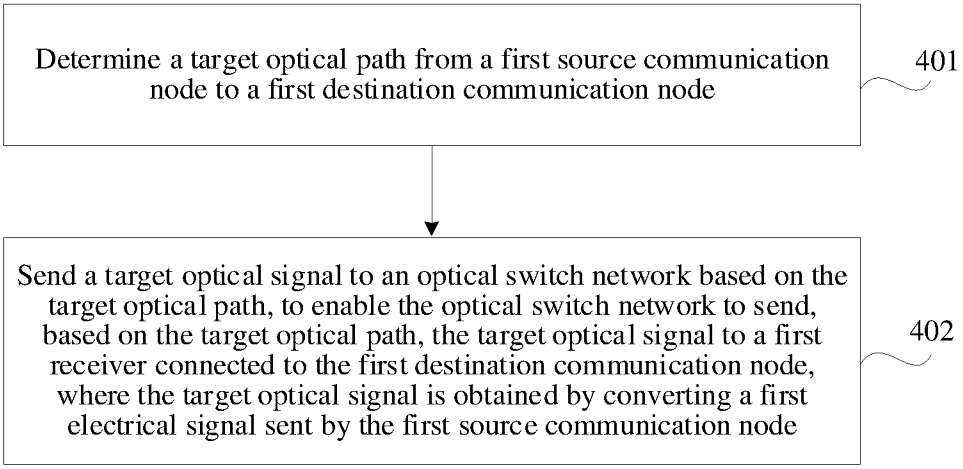
FIG. 17 is a schematic flowchart of another communication method according to an embodiment of this application.

FIG. 17 is a schematic flowchart of another communication method according to an embodiment of this application. The communication method may be applied to the transmitter shown in FIG. 14. As shown in FIG. 17, the method includes the following steps.

S401: Determine a target optical path from a first source communication node to a first destination communication node.

S402: Send a target optical signal to an optical switch network based on the target optical path, to enable the optical switch network to send, based on the target optical path, the target optical signal to a first receiver connected to the first destination communication node. The target optical signal is obtained by converting a first electrical signal sent by the first source communication node.

In the communication method provided in this embodiment of this application, after converting the first electrical signal sent by a first source communication node into the target optical signal, the first transmitter can determine, from a plurality of optical paths configured in the optical switch network, a target optical path from the first source communication node to the first destination communication node. In this way, after the optical switch network receives the target optical signal sent by the first transmitter, an optical switch may directly send the target optical signal to the first receiver based on the target optical path, to enable the first receiver to convert the target optical signal into a second electrical signal and send the second electrical signal to a first destination communication node. In this way, when a first source communication node communicates with the first destination communication node, optical-to-electrical conversion does not need to be performed in the optical switch network, so that a communication latency between communication nodes is effectively reduced.

It may be clearly understood by a person skilled in the art that, for the purpose of convenient and brief description, for detailed steps and effects of the communication methods described in FIG. 16 and FIG. 17, refer to corresponding processes and effects in the foregoing communication system embodiments. Details are not described herein again.

Figure 18:
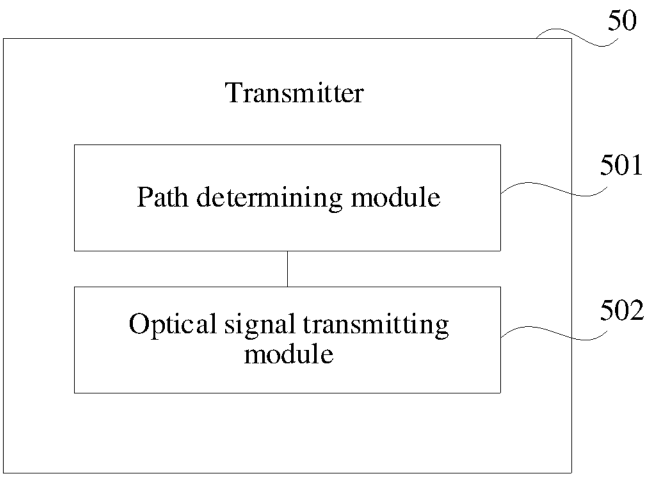
FIG. 18 is a block diagram of a structure of a transmitter according to an embodiment of this application.

FIG. 18 is a block diagram of a structure of a transmitter according to an embodiment of this application. As shown in FIG. 18, a transmitter 50 includes a path determining module 501, configured to determine a target optical path from a first source communication node to a first destination communication node, and an optical signal transmitting module 502, configured to send the target optical signal to the optical switch network based on the target optical path. The target optical signal is obtained by converting a first electrical signal sent by the first source communication node.

Optionally, the path determining module 501 is configured to determine the target optical path from the first source communication node to the first destination communication node based on a routing table. The routing table is used to record an optical path from a source communication node to a destination communication node.

In an optional example, the routing table is used to record a correspondence between a destination communication node and a wavelength. Different optical paths that are in one-to-one correspondence with optical signals of different wavelengths transmitted by the transmitter are configured in the optical switch network. Each optical path corresponds to one destination communication node. The transmitter further includes a wavelength determining module, configured to determine a target wavelength based on the first destination communication node and the routing table, and an optical signal generation module, configured to modulate an optical signal of the target wavelength based on the first electrical signal, to obtain the target optical signal.

In an implementation, the transmitter is connected to a light source pool. The light source pool is used to provide optical signals of different wavelengths. The transmitter further includes a wavelength selection module, configured to select an optical signal of the target wavelength from the optical signals provided by the light source pool.

In another implementation, the transmitter has a tunable laser. The transmitter further includes a wavelength selection module, configured to emit an optical signal of the target wavelength by using the tunable laser.

In another optional example, the routing table is used to record a correspondence between a destination communication node and an input port of the optical switch network. Different optical paths that are in one-to-one correspondence with different input ports are configured in the optical switch network. Each optical path corresponds to one destination communication node. The transmitter further includes a port determining module, configured to determine a target input port based on the first destination communication node and the routing table. The optical signal transmitting module is configured to send the target optical signal to the target input port of the optical switch network.

Optionally, the first electrical signal sent by the first source communication node carries data information. The transmitter further includes a control information sending module, configured to send control information by using an electrical switch.

For a working process and a corresponding effect of each module in the transmitter, refer to a working process and a corresponding effect of the transmitter in the foregoing communication system. Details are not described in this embodiment of this application again.

The communication system, the transmitter, and the communication method provided in the foregoing embodiments belong to a same concept. For a specific implementation process, refer to the method embodiments. A person of ordinary skill in the art may understand that all or some of the steps of the foregoing embodiments may be implemented by hardware or a program instructing related hardware. The program may be stored in a computer-readable storage medium. The storage medium mentioned above may be a read-only memory, a magnetic disk, an optical disc, or the like. In this application, terms “first” and “second” merely used for description, but cannot be understood as an indication or implication of relative importance. The term “a positive integer greater than 1” means at least two. The term “a plurality of” means two or more, unless otherwise expressly limited. “A refers to B” means that A is the same as B, or A is a simple variant of B. The term “and/or” in this application describes only an association relationship for describing associated objects and represents that three relationships may exist. For example, A and/or B may represent the following three cases: Only A exists, both A and B exist, and only B exists. In addition, the character “/” in this specification generally indicates an “or” relationship between the associated objects. The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A communication system, comprising a transmitter, configured to determine a target optical path from a source communication node to a destination communication node based on a routing table, and further configured to send a target optical signal to an optical switch network based on the target optical path, wherein the source communication node is connected to the transmitter, and wherein the target optical signal is obtained by converting a first electrical signal sent by the source communication node, wherein the routing table is used to record an optical path from the source communication node to the destination communication node, and wherein the routing table is used to record a correspondence between the destination communication node and an input port of the optical switch network, or wherein the routing table is used to record a correspondence between the destination communication node and a wavelength;

the optical switch network, wherein the optical switch network comprises one or more optical switches, wherein a plurality of optical paths are configured in the optical switch network, and wherein the optical switch network is used to send, based on the target optical path, the target optical signal to a receiver connected to the destination communication node; and the receiver, wherein the receiver is configured to receive the target optical signal, convert the target optical signal into a second electrical signal, and is further configured to send the second electrical signal to the destination communication node.

2. The communication system according to claim 1, wherein different optical paths that are in one-to-one correspondence with optical signals of different wavelengths transmitted by the transmitter are configured in the optical switch network, and wherein each optical path corresponds to one destination communication node; and wherein the transmitter is further configured to:

determine a target wavelength based on the destination communication node and the routing table; and obtain the target optical signal by modulating an optical signal of the target wavelength based on the first electrical signal.

3. The communication system according to claim 2, wherein the communication system further comprises a light source pool, and wherein the light source pool is used to provide the optical signals of different wavelengths; and wherein the transmitter is further configured to select the optical signal of the target wavelength from the optical signals provided by the light source pool.

4. The communication system according to claim 2, wherein the transmitter comprises a tunable laser, and wherein the transmitter is configured to emit the optical signal of the target wavelength using the tunable laser.

5. The communication system according to claim 2, wherein at least one optical switch of the one or more optical switches is a wavelength selective switch (WSS); or at least one optical switch of the one or more optical switches comprises an arrayed waveguide grating (AWG) and a plurality of optical switching units, and wherein each optical switching unit of the plurality of optical switching units is configured to adjust an optical path direction of each channel of the optical signal output by the AWG.

6. The communication system according to claim 1, wherein different optical paths that are in one-to-one correspondence with different input ports are configured in the optical switch network, and wherein each optical path corresponds to one destination communication node; and wherein the transmitter is further configured to:

determine a target input port based on the destination communication node and the routing table; and send the target optical signal to the target input port of the optical switch network.

7. The communication system according to claim 6, wherein the communication system comprises a 1*N optical switching unit, wherein the 1*N optical switching unit has one input port and a plurality of output ports, and the 1*N optical switching unit is configured to select an output port from the plurality of output ports to output an optical signal;

wherein an output port of the transmitter is connected to the input port of the 1*N optical switching unit, and wherein each output port of the 1*N optical switching unit is connected to one input port of the optical switch network; and wherein the transmitter is configured to control the 1*N optical switching unit to select an output port connected to the target input port to output the target optical signal, to enable the target optical signal to be sent to the target input port of the optical switch network.

8. The communication system according to claim 6, further comprising a splitter and a plurality of energy regulators, wherein the plurality of energy regulators are respectively connected to a plurality of input ports of the optical switch network;

wherein the splitter is configured to split an optical signal input by the transmitter into a plurality of channels of optical signals, and to send the plurality of channels of optical signals to the plurality of energy regulators respectively;

wherein an energy regulator of the plurality of energy regulators is configured to adjust energy of the optical signals sent by the splitter; and wherein the transmitter is further configured to control the plurality of energy regulators to enable the target optical signal to be sent to the target input port of the optical switch network.

9. The communication system according to claim 8, wherein the energy regulator comprises at least one of: an optical amplifier (OA) or a variable optical attenuator (VOA).

10. The communication system according to claim 6, wherein an optical switch of the one or more optical switches comprises a distribution frame, and wherein the distribution frame has a plurality of input ports and a plurality of output ports; and wherein each input port of the plurality of input ports of the distribution frame is connected to each output port of the plurality of output ports of the distribution frame through an optical fiber.

11. The communication system according to claim 1, wherein the optical switch network is configured to transmit the target optical signal to the receiver without performing optical-to-electrical conversion on the target optical signal.

12. A transmitter, comprising:

a network adapter, configured to determine a target optical path from a source communication node to a destination communication node based on a routing table, wherein the routing table is used to record an optical path from the source communication node to the destination communication node, and wherein the routing table is used to record a correspondence between the destination communication node and an input port of an optical switch network, or wherein the routing table is used to record a correspondence between the destination communication node and a wavelength; and an optical module, configured to enable the optical switch network to send, based on the target optical path, a target optical signal to a receiver connected to the destination communication node by sending the target optical signal to the optical switch network based on the target optical path, wherein the target optical signal is obtained by converting a first electrical signal sent by the source communication node.

13. The transmitter according to claim 12, wherein different optical paths that are in one-to-one correspondence with optical signals of different wavelengths transmitted by the transmitter are configured in the optical switch network, wherein each optical path corresponds to one destination communication node, and wherein the network adapter is further configured to determine a target wavelength based on the destination communication node and the routing table; and wherein the optical module is further configured to modulate an optical signal of the target wavelength based on the first electrical signal, to obtain the target optical signal.

14. The transmitter according to claim 13, wherein the transmitter is configured to be connected to a light source pool, wherein the light source pool is used to provide the optical signals of different wavelengths, and wherein the network adapter is further configured to select the optical signal of the target wavelength from the optical signals provided by the light source pool.

15. The transmitter according to claim 13, wherein the transmitter has a tunable laser, and wherein the network adapter is configured to control the tunable laser to emit the optical signal of the target wavelength using the tunable laser.

16. A communication method, comprising:

determining, by a transmitter, a target optical path from a source communication node to a destination communication node based on a routing table, wherein the routing table is used to record an optical path from the source communication node to the destination communication node, and wherein the routing table is used to record a correspondence between the destination communication node and an input port of an optical switch network, or wherein the routing table is used to record a correspondence between the destination communication node and a wavelength;

sending a target optical signal to the optical switch network based on the target optical path, wherein the source communication node is connected to the transmitter, wherein the target optical signal is obtained by converting a first electrical signal sent by the source communication node, wherein the optical switch network comprises one or more optical switches, and wherein a plurality of optical paths are configured in the optical switch network;

sending, by the optical switch network, based on the target optical path, the target optical signal to a receiver connected to the destination communication node;

receiving, by the receiver, the target optical signal; and converting the target optical signal into a second electrical signal, and then sending the second electrical signal to the destination communication node.

17. The communication method according to claim 16, wherein different optical paths that are in one-to-one correspondence with optical signals of different wavelengths transmitted by the transmitter are configured in the optical switch network, wherein each optical path corresponds to one destination communication node; and wherein the communication method further comprises:

determining, by the transmitter, a target wavelength based on the destination communication node and the routing table; and obtaining the target optical signal by modulating, by the transmitter, an optical signal of the target wavelength based on the first electrical signal.

18. The communication method according to claim 16, wherein different optical paths that are in one-to-one correspondence with different input ports are configured in the optical switch network, wherein each optical path corresponds to one destination communication node; and wherein the communication method further comprises:

determining, by the transmitter, a target input port based on the destination communication node and the routing table; and sending, by the transmitter, the target optical signal to the target input port of the optical switch network.

* * * * *